(12) United States Patent
Hirose et al.

(10) Patent No.: US 9,214,667 B2
(45) Date of Patent: Dec. 15, 2015

(54) LITHIUM-ION SECONDARY BATTERY, ANODE FOR LITHIUM-ION SECONDARY BATTERY, POWER TOOL, ELECTRIC VEHICLE AND ENERGY STORAGE SYSTEM

(75) Inventors: Takakazu Hirose, Fukushima (JP); Motoki Endo, Fukushima (JP); Kenichi Kawase, Fukushima (JP)

(73) Assignee: SONY CORPORATION, Tokyo (JP)

( * ) Notice: Subject to any disclaimer, the term of this patent is extended or adjusted under 35 U.S.C. 154(b) by 491 days.

(21) Appl. No.: 12/956,483

(22) Filed: Nov. 30, 2010

(65) Prior Publication Data
US 2011/0136008 A1   Jun. 9, 2011

(30) Foreign Application Priority Data

Dec. 9, 2009 (JP) .................... P2009-279802

(51) Int. Cl.
| | |
|---|---|
| *H01M 4/134* | (2010.01) |
| *B60L 11/18* | (2006.01) |
| *H01M 4/04* | (2006.01) |
| *H01M 4/1395* | (2010.01) |
| *H01M 4/62* | (2006.01) |
| *H01M 10/0525* | (2010.01) |
| *H01M 10/0583* | (2010.01) |
| *H01M 10/0587* | (2010.01) |

(52) U.S. Cl.
CPC ......... *H01M 4/134* (2013.01); *B60L 11/1879* (2013.01); *H01M 4/0421* (2013.01); *H01M 4/0471* (2013.01); *H01M 4/1395* (2013.01); *H01M 4/622* (2013.01); *H01M 10/0525* (2013.01); *H01M 4/625* (2013.01); *H01M 10/0583* (2013.01); *H01M 10/0587* (2013.01); *Y02E 60/122* (2013.01); *Y02T 10/705* (2013.01); *Y02T 10/7005* (2013.01); *Y02T 10/7011* (2013.01)

(58) Field of Classification Search
CPC ............ B60L 11/1879; H01M 4/0421; H01M 4/0471; H01M 4/134; H01M 4/1395; H01M 4/622; H01M 10/0525; H01M 10/0583; H01M 10/0587; H01M 4/625
USPC ....................... 429/209, 213, 218.1
See application file for complete search history.

(56) References Cited

U.S. PATENT DOCUMENTS

| | | | |
|---|---|---|---|
| 7,494,743 B2 | 2/2009 | Hirose et al. | |
| 2005/0031924 A1* | 2/2005 | Shirono et al. ................ | 429/30 |
| 2007/0059607 A1* | 3/2007 | Nakanishi et al. ............ | 429/330 |
| 2008/0245735 A1* | 10/2008 | Hennige et al. ............... | 210/650 |
| 2009/0035664 A1* | 2/2009 | Chiang et al. ................ | 429/317 |
| 2009/0111019 A1* | 4/2009 | Hirose et al. ................ | 429/199 |
| 2009/0174845 A1* | 7/2009 | Takagi ........................... | 349/96 |

FOREIGN PATENT DOCUMENTS

| | | |
|---|---|---|
| JP | 2005-307085 | 11/2005 |
| JP | 2007-095563 | 4/2007 |

* cited by examiner

*Primary Examiner* — Muhammad Siddiquee
(74) *Attorney, Agent, or Firm* — Dentons US LLP

(57) ABSTRACT

A lithium-ion secondary battery allowed to improve cycle characteristics and initial charge-discharge characteristics is provided. The lithium-ion secondary battery includes: a cathode; an anode including an anode active material layer; and an electrolytic solution. The anode active material layer includes an anode active material and an inorganic compound, and the inorganic compound includes one or both of an alkoxysilane compound and a hydrolysate thereof.

11 Claims, 12 Drawing Sheets

LITHIUM-ION SECONDARY BATTERY, ANODE FOR LITHIUM-ION SECONDARY BATTERY, POWER TOOL, ELECTRIC VEHICLE AND ENERGY STORAGE SYSTEM

BACKGROUND OF THE INVENTION

1. Field of the Invention

The present invention relates to an anode for lithium-ion secondary battery including an anode active material layer allowed to insert and extract lithium ions, a lithium-ion secondary battery using the same, and a power tool, an electric vehicle and an energy storage system using the same.

2. Description of the Related Art

In recent years, small electronic devices typified by portable terminals and the like have been widely used, and further size and weight reduction and longer life of the electronic devices have been strongly demanded. Accordingly, as power sources, batteries, in particular, small and lightweight secondary batteries allowed to obtain a high energy density have been developed. Recently, applications of such secondary batteries to not only small electronic devices but also large electronic devices typified by vehicles have been studied.

In particular, lithium-ion secondary batteries utilizing insertion and extraction of lithium ions for charge-discharge reactions holds great promise, because the secondary batteries are allowed to obtain a higher energy density than lead-acid batteries or nickel-cadmium batteries.

The lithium-ion secondary battery includes a cathode, an anode and an electrolytic solution. The anode includes an anode active material layer on an anode current collector, and the anode active material layer includes an anode active material involved in charge-discharge reactions.

As the anode active material, a carbon material is widely used. However, since a further improvement in battery capacity has been demanded recently, it is considered to use silicon or tin. The theoretical capacities of silicon (4199 mAh/g) and tin (994 mAh/g) are much higher than the theoretical capacity of graphite (372 mAh/g), so a significant improvement in battery capacity is expected. In this case, it is considered to use not only a simple substance of silicon or tin but also an alloy, a compound or the like of silicon or tin.

To improve various kinds of performance of the lithium-ion secondary battery, various specific configurations of the lithium-ion secondary batteries have been studied. More specifically, to improve cycle characteristics, a fluorine resin or a polyimide is included in anode active material particles including silicon as a constituent element, for example, as described in Japanese Unexamined Patent Application Publication No. 2007-095563. In this case, an anode material is evaporated with the fluorine resin or the like. In addition to this, to obtain an ion-conductive material with high heat resistance which is used for a solid electrolyte, polyorganosiloxane is used, for example, as described in Japanese Unexamined Patent Application Publication No. 2005-307085.

SUMMARY OF THE INVENTION

A plurality of gaps are present in an anode active material layer irrespective of method of forming the anode active material layer. When the number of gaps and capacities of the gaps are large, a reaction area of the anode active material layer is increased, so the decomposition reaction of an electrolytic solution easily proceeds. Therefore, cycle characteristic and initial charge-discharge characteristics which are important characteristics of the lithium-ion secondary battery are likely to decline.

On the other hand, in recent years, electronic devices have higher performance and more functions, and the electronic devices are more frequently used, so lithium-ion secondary batteries tend to be frequently charged and discharged. Therefore, a further improvement in cycle characteristics and initial charge-discharge characteristics of the lithium-ion secondary batteries is desired.

It is desirable to provide an anode for lithium-ion secondary battery allowed to improve cycle characteristics and initial charge-discharge characteristics, a lithium-ion secondary battery using the same, and a power tool, an electric vehicle and an energy storage system using the same.

According to an embodiment of the invention, there is provided an anode for lithium-ion secondary battery including: an anode active material layer including an anode active material and an inorganic compound, the inorganic compound including one or both of an alkoxysilane compound and a hydrolysate thereof. Moreover, according to an embodiment of the invention, there is provided a lithium-ion secondary battery including: an anode; a cathode; and an electrolytic solution, in which the anode has the same configuration as that of the above-described anode for lithium-ion secondary battery. Further, according to an embodiment of the invention, there are provided a power tool, an electric vehicle and an energy storage system using a lithium-ion secondary battery as a power supply or a power storage source in which the lithium-ion secondary battery has the same configuration as that of the above-described lithium-ion secondary battery according to the embodiment of the invention.

In the anode for lithium-ion secondary battery according to the embodiment of the invention, the anode active material layer includes the anode active material and the inorganic compound (including one or both of an alkoxysilane compound and a hydrolysate thereof). Compared to the case where the inorganic compound is not included and the case where any other material (any other kind of inorganic compound or an organic material) is included, gaps in the anode active material layer is filled with the inorganic compound to reduce a reaction area of the anode active material layer. Therefore, in the lithium-ion secondary battery using the anode for lithium-ion secondary battery according to the embodiment of the invention, the decomposition reaction of the electrolytic solution is prevented, so that cycle characteristics and initial charge-discharge characteristics are allowed to be improved. Moreover, in the power tool, the electric vehicle and the energy storage system using the lithium-ion secondary battery according to the embodiment of the invention, an improvement in characteristics such as the above-described cycle characteristics is achievable.

Other and further objects, features and advantages of the invention will appear more fully from the following description.

DETAILED DESCRIPTION OF THE PREFERRED EMBODIMENTS

Figure 1:
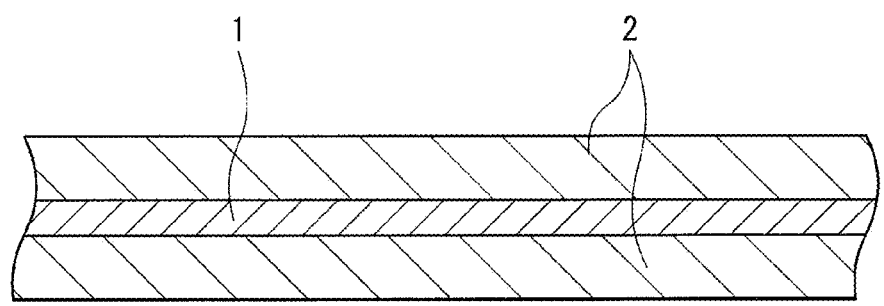
FIG. 1 is a sectional view illustrating a configuration of an anode for lithium-ion secondary battery according to an embodiment of the invention.
Figure 2A:
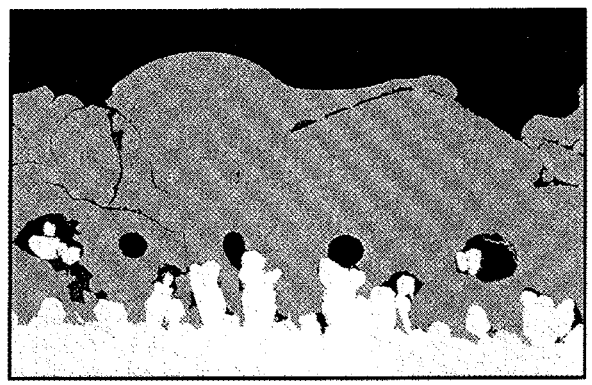
FIGS. 2A and 2B are a scanning electron microscope (SEM) photograph and a schematic view illustrating a sectional configuration of the anode for lithium-ion secondary battery illustrated in FIG. 1, respectively.
Figure 2B:
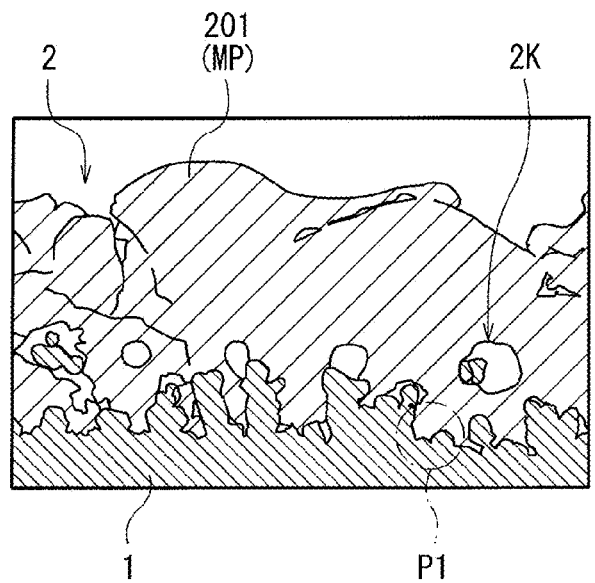

A preferred embodiment of the invention will be described in detail below referring to the accompanying drawings. Descriptions will be given in the following order.
1. Anode for lithium-ion secondary battery
2. Lithium-ion secondary battery
2-1. Prismatic type
2-2. Cylindrical type
2-3. Laminate film type
3. Applications of secondary battery
  1. Anode for Lithium-Ion Secondary Battery FIG. 1 illustrates a sectional configuration of an anode for lithium-ion secondary battery (hereinafter simply referred to as "anode") according to an embodiment of the invention.

Whole Configuration of Anode

The anode includes, for example, an anode active material layer 2 on an anode current collector 1. The anode active material layer 2 may be arranged on both surfaces or only one surface of the anode current collector 1. However, the anode current collector 1 may be removed.

Anode Current Collector

The anode current collector 1 is made of, for example, a conductive material with good electrochemical stability, electrical conductivity and mechanical strength. Examples of the conductive material include copper (Cu), nickel (Ni), stainless and the like, and in particular, a material which does not form an intermetallic compound with lithium (Li) and is alloyed with the anode active material layer 2 is preferable.

Surfaces of the anode current collector 1 are preferably roughened, because adhesion between the anode current collector 1 and the anode active material layer 2 is improved by a so-called anchor effect. Examples of a roughening method include electrolytic treatment, a sandblast process and the like. The electrolytic treatment is a method of forming fine particles on a surface of metal foil or the like in an electrolytic bath by an electrolytic method to form a roughened surface. Copper foil formed by the electrolytic treatment is generally called "electrolytic copper foil".

Anode Active Material Layer

The anode active material layer 2 includes an anode active material and an inorganic compound. If necessary, the anode active material layer 2 may further include any other material such as an anode binder or an anode conductor.

The anode active material includes one kind or two or more kinds of anode materials allowed to insert and extract lithium ions. The kind of anode material is not specifically limited, but a material including one or both of silicon and tin as constituent elements is preferable, because they have a high capability of inserting and extracting lithium ions, so that a high energy density is obtained. Such an anode material is a simple substance, an alloy or a compound of silicon or a simple substance, an alloy or a compound of tin. The anode material may be a mixture of two or more kinds selected from them or may be a material including a phase of one kind or two or more kinds selected from them at least in part.

In the present invention, the "alloy" means an alloy including two or more kinds of metal elements as well as an alloy including one or more kinds of metal elements and one or more kinds of metalloid elements. Moreover, the "alloy" may include a non-metal element as a constituent element. The texture of the alloy includes a solid solution, a eutectic (eutectic mixture), an intermetallic compound, a texture in which two or more of them coexist, and the like.

Examples of alloys of silicon include materials including, in addition to silicon, one kind or two or more kinds selected from the group consisting of tin (Sn), nickel, copper, iron (Fe), cobalt (Co), manganese (Mn), zinc (Zn), indium (In), silver (Ag), titanium (Ti), germanium (Ge), bismuth (Bi), antimony (Sb) and chromium (Cr).

Examples of compounds of silicon include materials including oxygen (O) or carbon (C) as a constituent element in addition to silicon. The compounds of silicon may include, as constituent elements in addition to silicon, one kind or two or more kinds selected from the elements described in the alloys of silicon.

Examples of the alloys and compounds of silicon include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, SiC, $Si_3N_4$, $Si_2N_2O$, $SiO_v$ ($0<v\leq2$), $SnO_w$ ($0<w\leq2$) and LiSiO.

Examples of alloys of tin include materials including one kind or two or more kinds selected from the group consisting of silicon, nickel, copper, iron, cobalt, manganese, zinc, indium, silver, titanium, germanium, bismuth, antimony and chromium.

Examples of compounds of tin include materials including oxygen or carbon as a constituent element in addition to tin. The compounds of tin may include, as constituent elements in addition to tin, one kind or two or more kinds selected from the elements described in the alloys of tin.

Examples of the alloys and compounds of tin include SnCo, $SnSiO_3$, LiSnO, $Mg_2Sn$ and the like.

In particular, as the material including silicon, for example, the simple substance of silicon is preferable, because a high energy density is obtained, so that a lithium-ion secondary battery obtains good battery capacity, good cycle characteristics and the like. In the present invention, "simple substance" means just a general understanding of simple substance (which may include a trace amount of an impurity), and does not necessarily mean simple substance with a purity of 100%.

Moreover, as the material including tin, for example, a material including tin as a first constituent element, and second and third constituent elements is preferable. As the second constituent element, for example, one kind or two or more kinds are selected from the group consisting of elements of cobalt, iron, magnesium, titanium, vanadium, chromium, manganese, nickel, copper, zinc, gallium, zirconium, niobium, molybdenum, silver, indium, cerium (Ce), hafnium, tantalum, tungsten, bismuth and silicon. As the third constituent element, for example, one kind or two or more kinds are selected from the group consisting of boron, carbon, aluminum and phosphorus. When the second and third constituent elements are included, a high energy density is obtained, so the lithium-ion secondary battery obtains good battery capacity, good cycle characteristics and the like.

In particular, a material including tin, cobalt and carbon (a SnCoC-containing material) is preferable. As the composition of the SnCoC-containing material, for example, the carbon content is within a range of 9.9 wt % to 29.7 wt %, and the ratio of the tin content and the cobalt content (Co/(Sn+Co)) is within a range of 20 wt % to 70 wt %, because a high energy density is obtained in such a composition range.

The SnCoC-containing material includes a phase including tin, cobalt and carbon, and the phase preferably has a low crystalline structure or an amorphous structure. The phase is a reactive phase allowed to react with lithium, and good characteristics are obtained in the lithium-ion secondary battery by the presence of the phase. The half-width of a diffraction peak of the phase obtained by X-ray diffraction is preferably 1.0° or more at a diffraction angle of 2θ in the case where a CuKα ray is used as a specific X ray and the sweep rate is 1°/min, because lithium ions are inserted or extracted more smoothly, and the reactivity with an electrolytic solution or the like is reduced. The SnCoC-containing material may have a phase including the simple substance of each constituent element or a part of the constituent element in addition to a low crystalline phase or an amorphous phase.

Whether or not the diffraction peak obtained by X-ray diffraction corresponds to a reactive phase allowed to react with lithium may be easily determined by comparing between X-ray diffraction charts before and after electrochemical reaction with lithium. For example, when the position of the diffraction peak before the electrochemical reaction with lithium is different from the position of the diffraction peak after the electrochemical reaction, the diffraction peak corresponds to a reactive phase allowed to react with lithium. In this case, the diffraction peak of a low crystalline phase or an amorphous phase is detected within a range of, for example, 2θ=20° to 50°. The phase includes the above-described constituent elements, and it is considered that the phase is changed to be low crystalline or amorphous mainly by carbon.

In the SnCoC-containing material, at least a part of carbon as a constituent element is preferably bonded to a metal element or a metalloid element as another constituent element, because cohesion or crystallization of tin or the like is prevented. The bonding state of an element is checked by, for example, X-ray photoelectron spectroscopy (XPS). In a commercially available apparatus, an Al—Kα ray or an Mg—Kα ray is used as a soft X ray. In the case where at least a part of carbon is bonded to a metal element, a metalloid element or the like, the peak of a composite wave of the 1s orbit (C1s) of carbon is observed in a region lower than 284.5 eV. Note that energy calibration is performed so that the peak of the 4f orbit (Au4f) of a gold atom is obtained at 84.0 eV. In this case, in general, surface contamination carbon is present on a material surface, so the peak of C1s of the surface contamination carbon is defined at 284.8 eV and is used as energy reference. In an XPS measurement, the waveform of the peak of C1s is obtained as a form including the peak of the surface contamination carbon and the peak of carbon in the SnCoC-containing material, so the peak of the surface contamination carbon and the peak of carbon are separated by, for example, analysis with use of commercially available software. In the analysis of the waveform, the position of a main peak existing on a lowest binding energy side is used as an energy reference (284.8 eV).

The SnCoC-containing material may include still another constituent element, if necessary. As such a constituent element, one kind or two or more kinds are selected from the group consisting of silicon, iron, nickel, chromium, indium, niobium, germanium, titanium, molybdenum, aluminum, phosphorus, gallium and bismuth.

In addition to the SnCoC-containing material, a material including tin, cobalt, iron and carbon (an SnCoFeC-containing material) is also preferable. The SnCoFeC-containing material may be arbitrarily set. For example, a composition with a small iron content is set as follows. The carbon content is within a range of 9.9 wt % to 29.7 wt %, the iron content is within a range of 0.3 wt % to 5.9 wt %, and the ratio of the tin content and the cobalt content (Co/(Sn+Co)) is within a range of 30 wt % to 70 wt %. Moreover, for example, a composition with a large iron content is set as follows. The carbon content is within a range of 11.9 wt % to 29.7 wt %, and the ratio of the tin content, the cobalt content and the iron content ((Co+Fe)/(Sn+Co+Fe)) is within a range of 26.4 wt % to 48.5 wt %, and the ratio of the cobalt content and the iron content (Co/(Co+Fe)) is within a range of 9.9 wt % to 79.5 wt %, because in such a composition range, a high energy density is obtained. The SnCoFeC-containing material may further include another constituent element as in the case of the SnCoC-containing material. The SnCoFeC-containing material has the same physical properties (such as half-width) as those of the SnCoC-containing material.

The anode active material may include any other anode material not including one or both of silicon and tin as constituent elements. Examples of such an anode material include a carbon material, a metal oxide, and a polymer compound. Examples of the carbon material include graphitizable carbon, non-graphitizable carbon having the (002) plane with a surface separation of 0.37 nm or over, graphite having the (002) plane with a surface separation of 0.34 nm or over, and the like. More specific examples include pyrolytic carbons, cokes, glass-like carbon fibers, an organic polymer compound fired body, activated carbon, carbon blacks and the like. Cokes include pitch coke, needle coke, petroleum coke and the like. The organic polymer compound fired body is a material carbonized by firing a phenolic resin, a furan resin or the like at an appropriate temperature. The carbon material may have any of a fibrous shape, a spherical shape, a granular shape, and a scale-like shape. Examples of the metal oxide include iron oxide, ruthenium oxide, molybdenum oxide and the like. Examples of the polymer compound include polyacetylene, polyaniline, polypyrrole and the like.

The anode active material is formed by, for example, a coating method, a vapor-phase method, a liquid-phase method, a spraying method, a firing method (a sintering method), or a combination of two or more methods selected from them. In the coating method, for example, a particulate anode active material is mixed with a binder or the like to form a mixture, and the mixture is dispersed in an organic solvent, and then coating with the mixture is performed. Examples of the vapor-phase method include a physical deposition method, a chemical deposition method and the like. More specific examples include a vacuum deposition method, a sputtering method, an ion plating method, a laser ablation method, a thermal chemical vapor deposition (CVD) method, a plasma chemical vapor deposition method and the like. Examples of the liquid-phase method include an electrolytic plating method, an electroless plating method and the like. In the spray method, the anode active material in a molten state or a semi-molten state is sprayed. In the firing method, after coating is performed by the same steps as those in the coating method, the mixture is heated at a higher temperature than the melting point of the binder or the like. As the firing method, a known technique may be used. Examples of the firing method include an atmosphere firing method, a reaction firing method, a hot press firing method and the like.

In the case where the anode active material is formed by a deposition method such as the vapor-phase method, the anode active material may have a single-layer configuration formed by a single deposition step, or a multilayer configuration formed by a plurality of deposition steps. However, in the case where an evaporation method or the like associated with high heat is used for deposition, the anode active material preferably has a multilayer configuration, because when a step of depositing the anode material is performed a plurality of times separately (the anode material is thinly formed and sequentially deposited), compared to the case where the deposition step is performed only once, a duration in which the anode current collector 1 is exposed to high heat is reduced. Accordingly, the anode current collector 1 is less susceptible to thermal damage.

Moreover, the anode active material is grown from a surface of the anode current collector 1 in a thickness direction of the anode active material layer 2, and the anode active material at the bottom of the anode active material layer 2 is preferably coupled to the anode current collector 1, because the anode active material is physically fixed to the anode current collector 1; therefore, the anode active material layer 2 is less likely to be damaged or separated due to swelling and shrinkage of the anode active material layer 2 in response to charge and discharge. The meaning of "coupled to the anode current collector 1" is that the anode material is directly deposited on a surface of the anode current collector 1 by the above-described vapor-phase method or the like. Therefore, in the case where the anode active material layer 2 is formed by the coating method, the sintering method or the like, the anode active material is not coupled to the anode current collector 1. In this case, the anode active material is indirectly coupled to the anode current collector 1 with another material (such as an anode binder) in between, or the anode active material is just placed adjacent to the surface of the anode current collector 1.

At least a part of the anode active material may be in contact with the anode current collector 1. As long as only a part of the anode active material is in contact with the anode current collector 1, compared to the case where the anode active material is not at all in contact with the anode current collector 1, adhesion strength of the anode active material layer 2 to the anode current collector 1 is improved. In the case where a part of the anode active material is in contact with the anode current collector 1, some of anode active material particles are in contact with the anode current collector 1 and the other anode active material particles are not in contact with the anode current collector 1.

In the case where the anode active material does not have a non-contact part, the anode active material is in contact with a large part of the anode current collector 1, and electronic conductivity between the anode active material and the anode current collector 1 is thereby improved. On the other hand, there is no escape (space) for swelling and shrinkage of the anode active material in response to charge and discharge; therefore, the anode current collector 1 may be deformed due to an influence of a stress caused by the swelling and shrinkage.

On the other hand, in the case where the anode active material includes a non-contact part, there is an escape for the swelling and shrinkage of the anode active material; therefore, the anode current collector 1 is less likely to be deformed due to the influence of a stress caused by the swelling and shrinkage. On the other hand, there is a part where the anode current collector 1 and the anode active material are not in contact with each other, electronic conductivity therebetween may be reduced.

Moreover, the anode active material is formed by a vapor-phase method, a liquid-phase method, a spray method, a firing method or the like, and the anode active material are preferably alloyed in at least a part of an interface with the anode current collector 1, because adhesion of the anode active material layer 2 to the anode current collector 1 is further improved. In this case, in the interface therebetween, a constituent element of the anode current collector 1 may be diffused into the anode active material, or a constituent element of the anode active material may be diffused into the anode current collector 1, or they may be diffused into each other.

The inorganic compound includes one or both of an alkoxysilane compound and a hydrolysate thereof. The inorganic compound is formed, after forming the anode active material, by a process different from a process of forming the anode active material. Therefore, the anode active material layer 2 (including the anode active material) in a state where the inorganic compound is not yet formed includes a plurality of gaps therein, and the anode active material layer 2 in a state where the inorganic compound is formed includes the inorganic compound in the above-described gaps. In the case where the anode active material is in the form of a plurality of particles, the gaps are formed between the particles.

The anode active material layer 2 includes the inorganic compound, because the gaps of the anode active material layer 2 are filled with the inorganic compound. In particular, when the inorganic compound includes an alkoxysilane compound or the like, the gaps are completely and easily filled with the inorganic compound, compared to the case where the anode active material layer 2 does not include the inorganic compound or includes any other material. Air in the gaps is replaced with the alkoxysilane compound, so that the alkoxysilane compound spontaneously and easily enters into the gaps. Therefore, the gaps are sufficiently filled with the inorganic compound, and a reaction area of the anode active material layer 2 is thereby reduced remarkably.

Examples of the above-described other material include an inorganic compound such as polyimide or polyamide and an organic compound such as a fluorine resin. Polyimide or polyamide is not preferable, because polyimide or polyamide has poorer impregnation ability than the alkoxysilane compound or the like, as well as polyimide or polyamide has high resistance and easily reacts with lithium. Moreover, the fluorine resin is not preferable, because only edge parts of the gaps are covered with the fluorine resin, and central parts of the gaps are not filled with the fluorine resin.

The inorganic compound may be applied to not only the gaps in the anode active material layer 2 but also at least a part of a surface of the anode active material layer 2.

The kind of the alkoxysilane compound is not specifically limited, but a compound represented by a formula (1) is preferable. An alkoxysilane compound represented by the formula (1) (hereinafter simply referred to as "alkoxysilane compound") includes one or more alkoxy groups (—OR2) so as to form a polymer by hydrolysis (a dehydration-condensation reaction). In the case where a plurality of R1s are included, they may be groups of the same kind or different kinds. The same applies to the case where a plurality of R2s are included.

$$Si(R1)_n(OR2)_{4-n} \tag{1}$$

where R1 is a hydrocarbon group having 1 to 8 carbon atoms, R2 is a hydrocarbon group having 1 to 4 carbon atoms, and n is an integer of 0 to 3.

R1 and R2 may be unsubstituted hydrocarbon groups, or partially substituted hydrocarbon groups. The number of carbon atoms in R1 is not specifically limited, as long as the number is within a range of 1 to 8. However, the number of carbon atoms is preferably as small as possible. Examples of R1 include a methyl group, an ethyl group, an n-propyl group, an i-propyl group, a phenyl group and the like. The number of carbon atoms in R2 is not specifically limited as long as the number is within a range of 1 to 4. However, the number is preferably as small as possible. Examples of R2 include a methyl group, an ethyl group, a propyl group and the like. The value of n is not specifically limited as long as the value is within a range of 0 to 3. However, the value is preferably 1 or 2, because in the case where hydrolysis takes place, flexibility is easily obtained.

As the alkoxysilane compound, for example, one kind or two or more kinds are selected from the group consisting of methyltrimethoxysilane, ethyltrimethoxysilane, methyltriethoxysilane, methyltriisopropoxysilane, methyltributoxysilane, propyltrimethoxysilane, dimethyldimethoxysilane, phenyltrimethoxysilane, diphenyldimethoxysilane and phenylmethyldimethoxysilane. However, as the alkoxysilane compound, any other compound with a structure represented by the formula (1) may be used.

A hydrolysate of the alkoxysilane compound (hereinafter simply referred to as "hydrolysate") is a compound formed by hydrolyzing the above-described alkoxysilane compound. Herein, as represented by a formula (2), the hydrolysate is a polymer having a repeated structure of —Si—O— as a main chain. The formula (2) illustrates the case where a large number of kinds of alkoxysilane compounds (compounds with different numbers of R1 and R2) are hydrolyzed. The molecular weight of the hydrolysate is not specifically limited.

[Chemical Formula 1]

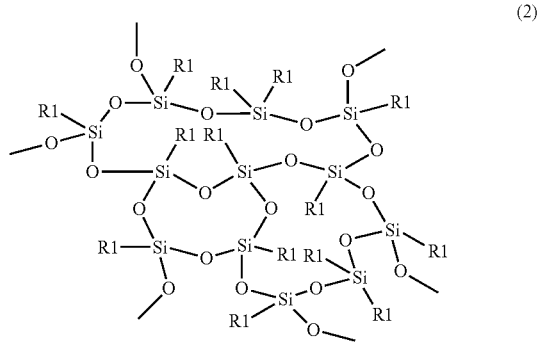

(2)

The hydrolysate is mainly formed by a reaction (a dehydration-condensation reaction) caused by a reaction of the alkoxysilane compound with water in air, and as a result of the reaction, the hydrolysate is hardened. The higher an environmental temperature is, the more quickly such a hardening reaction occurs. In the case where the inorganic compound includes both of the alkoxysilane compound and the hydrolysate, it is preferable that the inorganic compound initially includes only the alkoxysilane compound, and a part of the alkoxysilane compound reacts with water to form a hydrolysate (to cause coexistence of the alkoxysilane compound and the hydrolysate).

The inorganic compound may include both of the alkoxysilane compound and the hydrolysate, or one of them. In particular, the inorganic compound preferably includes both of them, and more preferably includes only the hydrolysate. As described above, the hydrolysate enters into the gaps, and then is hardened, so even if the anode active material layer 2 swells or shrinks in response to charge and discharge, the hydrolysate is less likely to escape from the gaps. The surface area of the anode active material layer 2 is thereby reduced stably; therefore, the hydrolysate is more preferable than the alkoxysilane compound.

To confirm whether the anode active material layer 2 includes the inorganic compound, the anode active material layer 2 is analyzed by, for example, a time-of-flight secondary ion mass spectrometer (TOF-SIMS). The presence of the alkoxysilane compound and the hydrolysate is allowed to be separately specified by such an analysis.

As the anode binder, for example, one kind or two or more kinds of synthetic rubber or polymers are selected. Examples of synthetic rubber include styrene butadiene-based rubber, fluorine-based rubber, ethylene propylene diene and the like. Examples of the polymers include polyvinylidene fluoride, polyimide and the like.

As the anode conductor, for example, one kind or two or more kinds of carbon materials such as graphite, carbon black, acetylene black and ketjen black are selected. The anode conductor may be a metal, a conductive polymer or the like, as long as the metal, the conductive polymer or the like is a material having electrical conductivity.

Now, a specific configuration example of the anode will be described below.

Figure 3A:
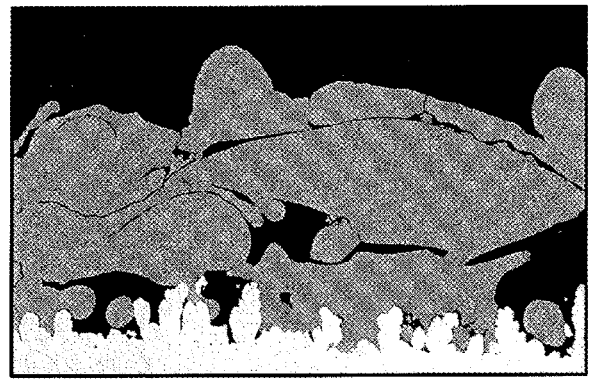
FIGS. 3A and 3B are an SEM photograph and a schematic view illustrating another sectional configuration of the anode for lithium-ion secondary battery illustrated in FIG. 1, respectively.
Figure 3B:
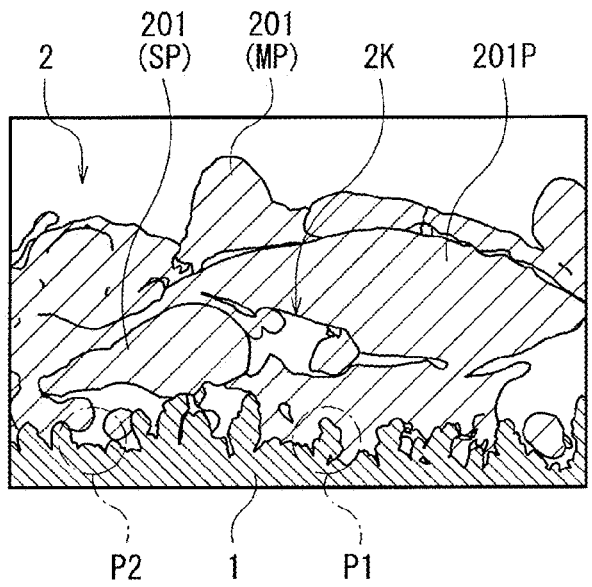
Figure 4A:
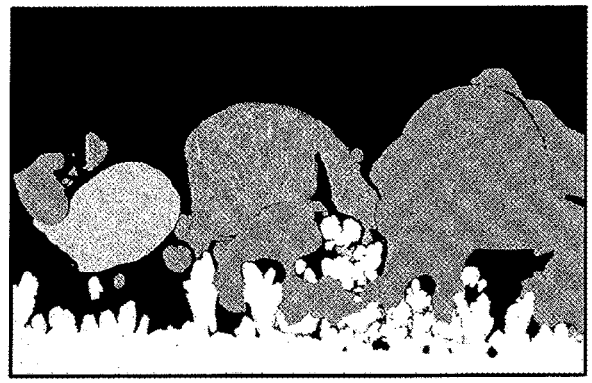
FIGS. 4A and 4B are an SEM photograph and a schematic view illustrating still another sectional configuration of the anode for lithium-ion secondary battery illustrated in FIG. 1, respectively.
Figure 4B:
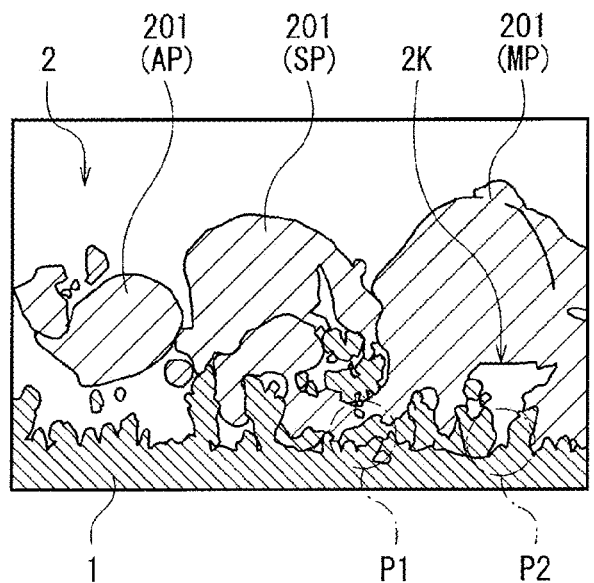
Figure 5A:
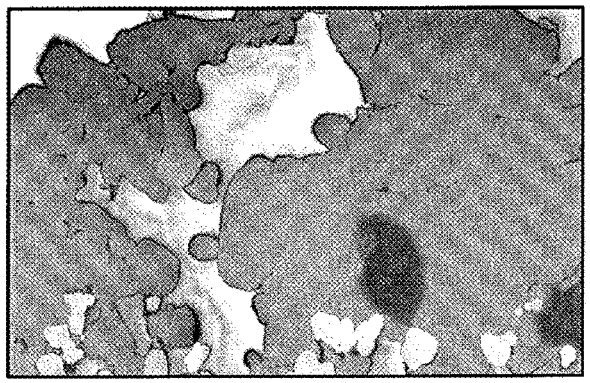
FIGS. 5A and 5B are an enlarged SEM photograph and an enlarged schematic view illustrating a sectional configuration of the anode for lithium-ion secondary battery illustrated in FIG. 1, respectively.
Figure 5B:
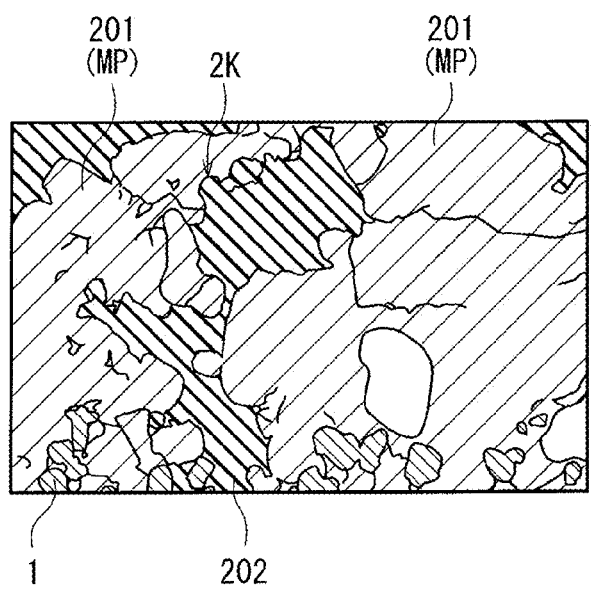

FIGS. 2A and 2B to 5A and 5B are SEM photographs (secondary electron images) and schematic views illustrating a sectional configuration of the anode illustrated in FIG. 1, respectively. FIGS. 2A and 2B to 4A and 4B illustrate, for reference, the case where the anode active material layer 2 includes only the anode active material, and FIGS. 5A and 5B illustrate the case where the anode active material layer 2 includes both of the anode active material and the inorganic compound. Moreover, FIGS. 2A and 2B, 3A and 3B, and 5A and 5B illustrate the case where the anode active material is the simple substance of silicon, and FIGS. 4A and 4B illustrate the case where the anode active material includes silicon and a metal element.

For example, as illustrated in FIGS. 2A and 2B to 4A and 4B, the anode active material layer 2 includes a plurality of particulate anode active materials (anode active material particles 201). For example, the anode active material particles 201 described herein are formed by depositing an anode material on a surface of the anode current collector 1 such as electrolytic copper foil by a vapor-phase method such as a spraying method, and the anode active material particles 201 have a multilayer configuration in which the anode material is stacked in a thickness direction of the anode active material layer 2.

For example, as illustrated in FIGS. 3A and 3B, at least some of the anode active material particles 201 have a flat shape (flat particles 201P), and the flat particles 201P overlap and are in contact with a plurality of other anode active material particles 201. The anode active material layer 2 includes, for example, a part (a contact part P1) where the anode active material particles 201 are in contact with the anode current collector 1 and a part (a non-contact part P2) where the anode active material particles 201 are not in contact with the anode current collector 1.

As illustrated in FIGS. 2A and 2B to 4A and 4B, the anode active material layer 2 includes a plurality of gaps 2K therein. The gaps 2K are, for example, a chipped part formed in the anode active material particles 201, spaces surrounded by a plurality of anode active material particles 201, and the like.

In the case where the anode active material particles 201 include silicon and a metal element, as illustrated in FIGS. 4A and 4B, the anode active material particles 201 have an alloy state (AP) or a compound (phase separation) state (SP). In addition, the anode active material particles 201 including only silicon have a simple substance state (MP).

These three crystalline states (MP, AP and SP) are clearly identified by the SEM photograph (FIG. 4A). More specifically, the simple substance state (MP), the alloy state (AP) and the phase separation state (SP) are observed as a uniform gray region, a uniform white region and a region where a gray part and a white part are mixed, respectively.

As illustrated in FIGS. 5A and 5B, the anode active material layer 2 includes an inorganic compound 202 in the gaps 2K. The inorganic compound 202 is arranged so that edge parts of the gaps 2K (surfaces of the anode active material particles 201) are covered with the inorganic compound 202 and central part of the gaps 2K are filled with the inorganic compound 202; therefore, the gaps 2K are completely filled with the inorganic compound 202. The gaps 2K are completely filled with the inorganic compound 202 in such a manner, because as described above, the inorganic compound 202 includes one or both of the alkoxysilane compound and the hydrolysate. Note that the magnification of the images in FIGS. 5A and 5B is larger than that in FIGS. 2A and 2B to 4A and 4B.

Method of Manufacturing Anode

The anode is manufactured by, for example, the following steps.

Steps in the case where a vapor-phase method such as a spray method is used as a method of forming the anode active material are as described below. First, the anode current collector 1 (such as roughened electrolytic copper foil) is prepared. Next, the anode material (a material including one or both of silicon and tin as constituent elements) is deposited on a surface of the anode current collector 1 by a spray method or the like to form a plurality of particulate anode active materials. Next, the alkoxysilane compound is dissolved in a solvent such as alcohol to form a processing solution for forming the inorganic compound. The concentration of the processing solution is arbitrarily set. Finally, the anode current collector 1 on which the anode active material is formed is immersed in the processing solution, and then the anode current collector 1 is taken out of the processing solution, and is dried. Thus, the anode active material layer 2 including the anode active material and the inorganic compound is formed. Conditions such as an immersing time in this case are arbitrarily set. In addition, instead of immersing the anode current collector 1 on which the anode active material is formed in the processing solution, the anode current collector 1 may be coated with the processing solution.

On the other hand, steps in the case where a coating method or a firing method is used as a method of forming the anode active material are as described below. First, as the anode active material, powder of the anode material (a material including one or both of silicon and tin as constituent elements) is prepared. Next, the powder of the anode active material is mixed with any other material such as an anode binder to form an anode mixture, and then, the anode mixture is dissolved in a solvent such as an organic solvent to form anode mixture slurry. Next, a surface of the anode current collector 1 is coated with the anode mixture slurry, and then is dried. Thereafter, if necessary a coating of the anode mixture slurry may be compression molded and heated (fired). The heating temperature in this case is arbitrarily set. Finally, as in the case where the vapor-phase method is used, the inorganic compound is formed with use of the processing solution. Thus, the anode active material layer 2 is formed.

Functions and Effects of Embodiment

In the anode, the anode active material layer 2 includes the anode active material and the inorganic compound (including one or both of the alkoxysilane compound and the hydrolysate). In this case, the gaps in the anode active material layer 2 are sufficiently filled, compared to the case where the inorganic compound is not included and the case where another material (any other kind of inorganic compound or an organic compound) is included; therefore, the reaction area of the anode active material layer 2 is remarkably reduced. Accordingly, the anode is allowed to contribute to an improvement in performance of a lithium-ion secondary battery using the anode.

2. Lithium-Ion Secondary Battery

Next, lithium-ion secondary batteries using the above-described anode for lithium-ion secondary battery will be described below.

2-1. Prismatic Type

Figure 6:
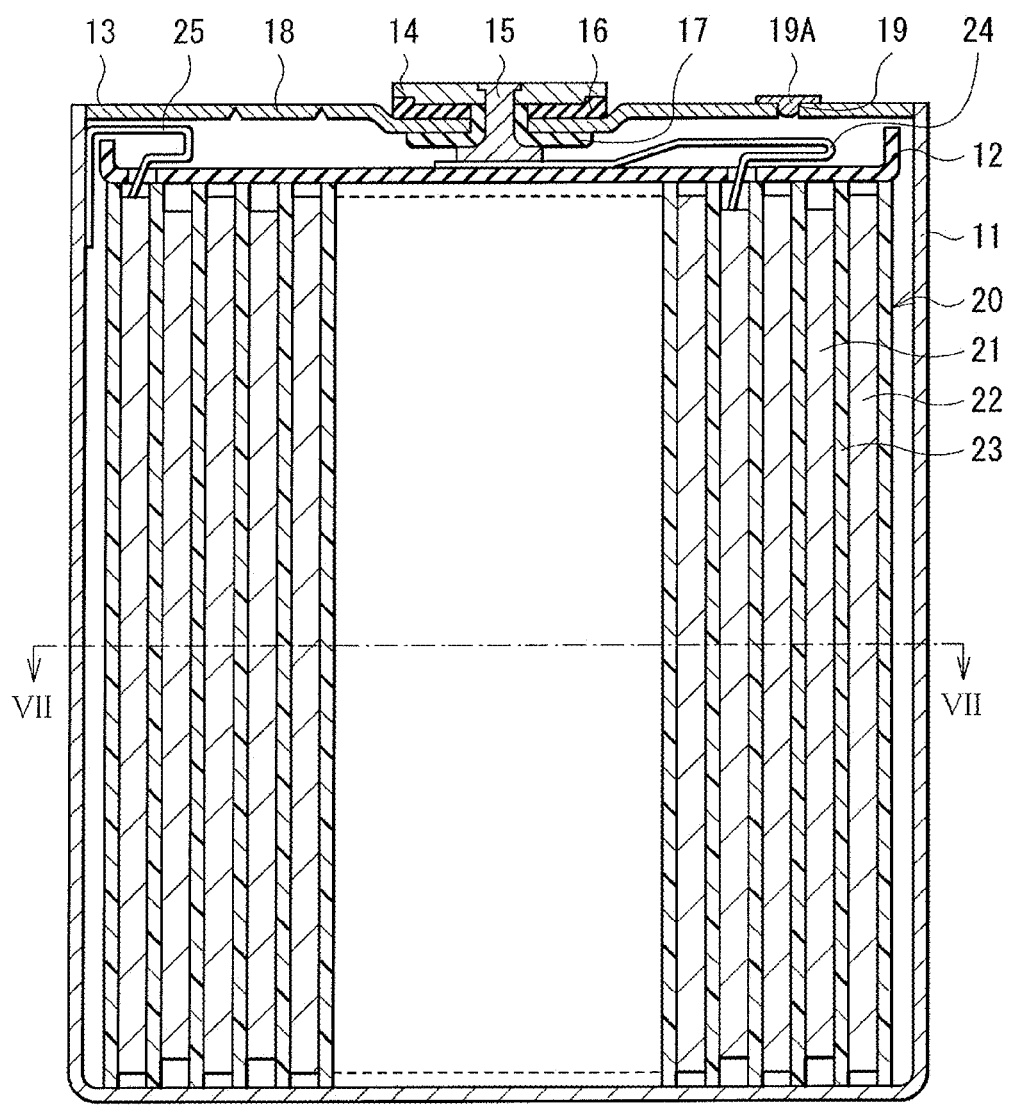
FIG. 6 is a sectional view illustrating a configuration of a prismatic type secondary battery using the anode for lithium-ion secondary battery according to the embodiment of the invention.
Figure 7:
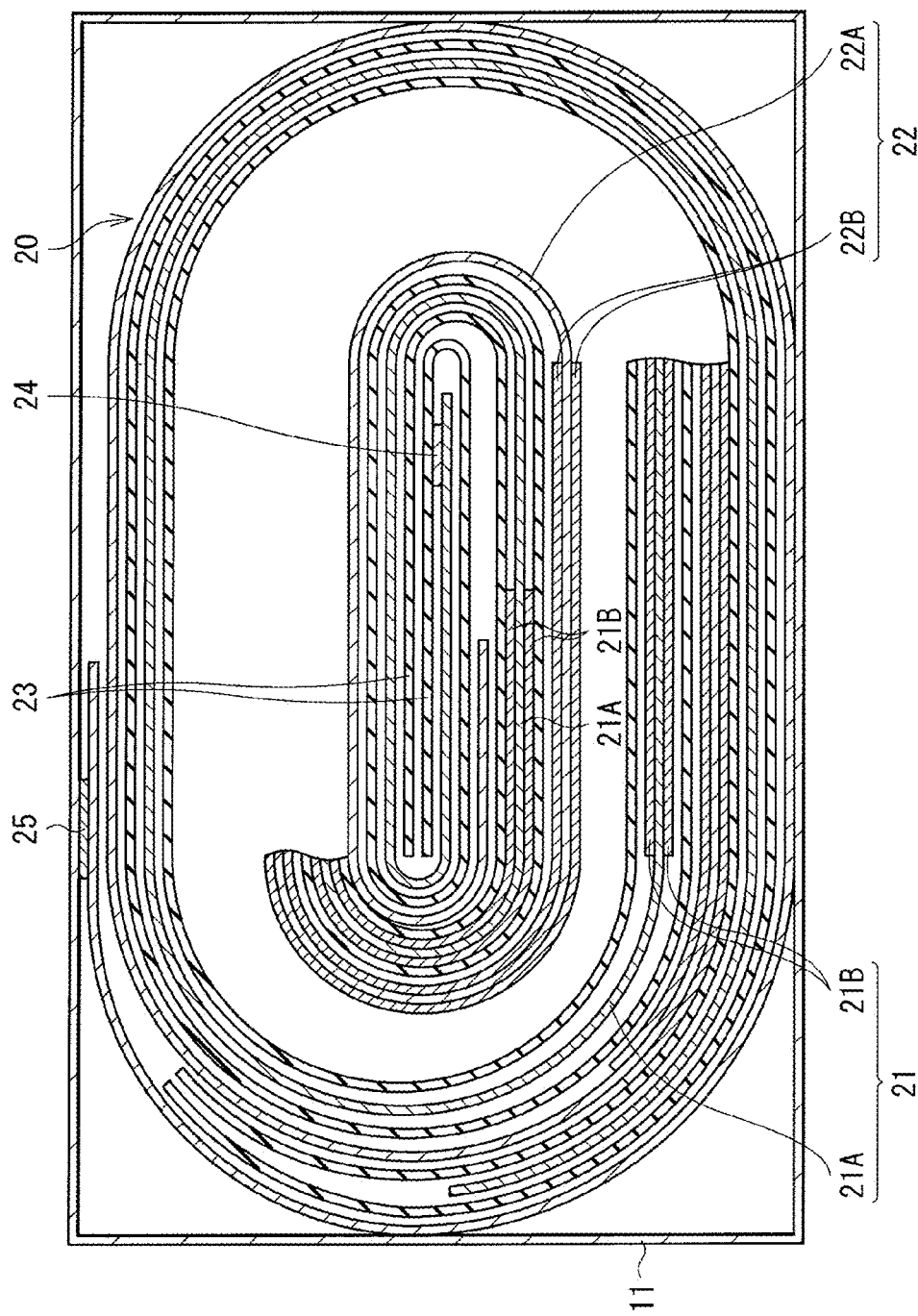
FIG. 7 is a sectional view taken along a line VII-VII of the prismatic type secondary battery illustrated in FIG. 6.
Figure 8:
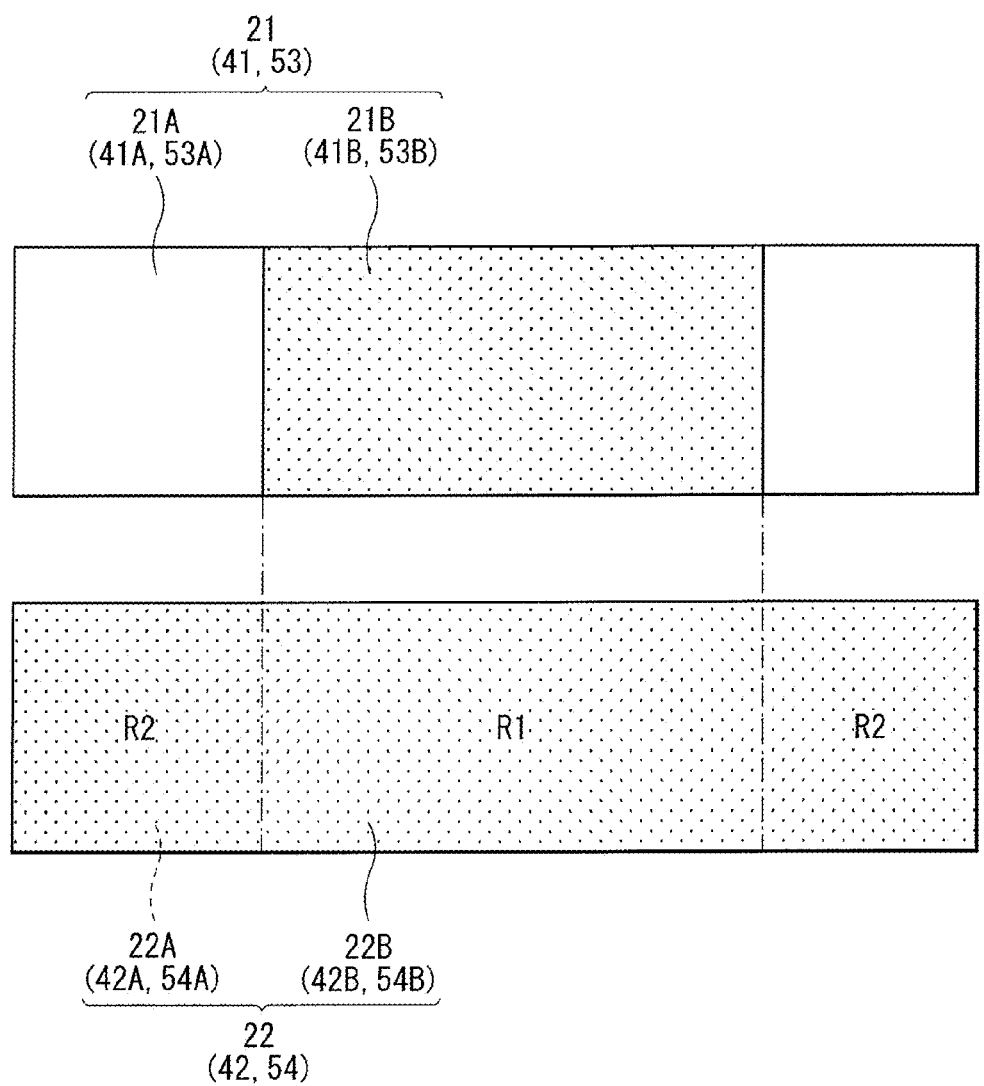
FIG. 8 is a schematic plan view illustrating configurations of a cathode and the anode illustrated in FIG. 6.

FIGS. 6 and 7 illustrate sectional configurations of a prismatic type secondary battery, and FIG. 7 illustrates a sectional view taken along a line VII-VII of FIG. 6. Moreover, FIG. 8 illustrates planar configurations of a cathode 21 and an anode 22 illustrated in FIG. 7.

Whole Configuration of Prismatic Type Secondary Battery

The prismatic type secondary battery is formed mainly by containing a battery element 20 in a battery can 11. The battery element 20 is a spirally wound laminate formed by laminating the cathode 21 and the anode 22 with a separator 23 in between and spirally winding them, and has a flat shape according to the shape of the battery can 11.

The battery can 11 is, for example, a prismatic package member. As illustrated in FIG. 7, in the prismatic package member, a sectional surface in a longitudinal direction has a rectangular shape or a substantially rectangular shape (including a curve in part), and the prismatic package member is applicable to not only a prismatic battery with a rectangular shape but also a prismatic battery with an oval shape. In other words, the prismatic package member is a vessel-shaped member having a rectangular closed end or a oval closed end and an opening with a rectangular shape or a substantially rectangular (oval) shape formed by connecting arcs with straight lines. FIG. 7 illustrates the battery can 11 having a rectangular sectional surface.

The battery can 11 is made of, for example, a conductive material such as iron or aluminum or an alloy thereof, and may have a function as an electrode terminal. To prevent swelling in response to charge and discharge of the battery can 11 with use of the hardness (resistance to deformation) of the battery can 11, iron which is harder than aluminum is preferable. In the case where the battery can 11 is made of iron, iron may be plated with nickel or the like.

Moreover, the battery can 11 has a hollow configuration having an open end and a closed end, and the battery can 11 is sealed by an insulating plate 12 and a battery cover 13 attached to the open end. The insulating plate 12 is arranged between the battery element 20 and the battery cover 13, and the insulating plate 12 is made of an insulating material such as polypropylene. The battery cover 13 is made of, for example, the same material as that of the battery can 11, and may have a function as an electrode terminal as in the case of the battery can 11.

A terminal plate 14 which is a cathode terminal is arranged outside of the battery cover 13, and the terminal plate 14 is electrically insulated from the battery cover 13 by an insulating case 16. The insulating case 16 is made of an insulating material such as polybutylene terephthalate. Moreover, a through hole is provided around the center of the battery cover 13, and a cathode pin 15 is inserted into the through hole so as to be electrically connected to the terminal plate 14 and to be electrically insulated from the battery cover 13 by a gasket 17. The gasket 17 is made of, for example, an insulating material, and its surface is coated with asphalt.

A cleavage valve 18 and an injection hole 19 are arranged around an edge of the battery cover 13. The cleavage valve 18 is electrically connected to the battery cover 13, and when an internal pressure in the secondary battery increases to a certain extent or higher due to an internal short circuit or external application of heat, the cleavage valve 18 is separated from the battery cover 13 to release the internal pressure. The injection hole 19 is filled with a sealing member 19A made of, for example, a stainless steel ball.

A cathode lead 24 made of a conductive material such as aluminum is attached to an end (for example, an inside end) of the cathode 21, and an anode lead 25 made of a conductive material such as nickel is attached to an end (for example, an outside end) of the anode 22. The cathode lead 24 is welded to an end of the cathode pin 15 and is electrically connected to the terminal plate 14. The anode lead 25 is welded and electrically connected to the battery can 11.

Cathode

The cathode 21 includes a cathode active material layer 21B on both surfaces of a cathode current collector 21A. However, the cathode active material layer 21B may be arranged on only one surface of the cathode current collector 21A.

The cathode current collector 21A is made of a conductive material such as aluminum, nickel or stainless.

The cathode active material layer 21B includes one kind or two or more kinds of materials allowed to insert and extract lithium ions as cathode active materials, and may include any other material such as a cathode binder or a cathode conductor, if necessary. Details of the cathode binder and the cathode conductor are the same as the above-described details of the anode binder and the anode conductor.

As the cathode material, a lithium-containing compound is preferable, because a high energy density is obtained. Examples of the lithium-containing compound include a complex oxide including lithium and a transition metal element as constituent elements and a phosphate compound including lithium and a transition metal element as constituent elements. In particular, a compound including one or two or more kinds selected from the group consisting of cobalt, nickel, manganese and iron as transition metal elements is preferable, because a higher voltage is obtained. The complex oxide and the phosphate compound are represented by, for example, $Li_xM1O_2$ and $Li_yM2PO_4$, respectively. In the chemical formulas, M1 and M2 represent one or more kinds of transition metal elements. The values of x and y depend on a charge-discharge state of the battery, and are generally within a range of $0.05 \leq x \leq 1.10$ and $0.05 \leq y \leq 1.10$, respectively.

Examples of the complex oxide including lithium and a transition metal element include lithium-cobalt complex oxide ($Li_xCoO_2$), lithium-nickel complex oxide ($Li_xNiO_2$), lithium-nickel-based complex oxide represented by a formula (3), and the like. Examples of the phosphate compound including lithium and a transition metal element include a lithium-iron phosphate compound ($LiFePO_4$), a lithium-iron-manganese phosphate compound ($LiFe_{(1-u)}Mn_uPO_4$ (u<1)), and the like, because high battery capacity and good cycle characteristics are obtained. Note that the cathode material may be any material other than the above-described materials.

$$LiNi_{1-x}M_xO_2 \quad (3)$$

where M is one or more kinds selected from the group consisting of cobalt, manganese, iron, aluminum, vanadium, tin, magnesium, titanium, strontium, calcium, zirconium, molybdenum, technetium, ruthenium, tantalum, tungsten, rhenium, ytterbium, copper, zinc, barium, boron, chromium, silicon, gallium, phosphorus, antimony and niobium, and x is within a range of $0.005<x<0.5$.

In addition to the above-described materials, examples of the cathode material include an oxide, a bisulfide, a chalcogenide, a conductive polymer and the like. Examples of the oxide include titanium oxide, vanadium oxide, manganese dioxide and the like. Examples of the bisulfide include titanium bisulfide, molybdenum sulfide and the like. Examples of the chalcogenide include niobium selenide and the like. Examples of the conductive polymer include sulfur, polyaniline, polythiophene and the like.

Anode

The anode 22 has the same configuration as that of the above-described anode for lithium-ion secondary battery, and includes an anode active material layer 22B on both surfaces of an anode current collector 22A. The configurations of the anode current collector 22A and the anode active material layer 22B are the same as those of the anode current collector 1 and the anode active material layer 2 in the above-described anode, respectively. In the anode 22, the chargeable capacity of the anode material allowed to insert and extract lithium ions is preferably larger than the discharge capacity of the cathode 21, because lithium metal is prevented from being deposited without intention during charge and discharge.

As illustrated in FIG. 8, for example, the cathode active material layer 21B is arranged on a part (for example, a central region in a longitudinal direction) of a surface of the cathode current collector 21A. On the other hand, for example, the anode active material layer 22B is arranged on a whole surface of the anode current collector 22A. Therefore, the anode active material layer 22B is arranged in a region (an opposed region R1) opposed to the cathode active material layer 21B and a region (a non-opposed region R2) not opposed to the cathode active material layer 21B in the anode current collector 22A. In this case, whereas a part arranged in the opposed region R1 of the anode active material layer 22B is involved in charge and discharge, a part arranged in the non-opposed region R2 of the anode active material layer 22B is hardly involved in charge and discharge. Note that in FIG. 8, shaded areas indicate the cathode active material layer 21B and the anode active material layer 22B.

As described above, the anode active material layer 22B includes the anode active material and the inorganic compound, and the gaps formed in the anode active material layer 22B are filled with the inorganic compound. However, when the anode active material layer 22B swells and shrinks in response to charge and discharge, the anode active material layer 22B is deformed or broken due to an influence of a stress caused by swelling and shrinkage; therefore, the formation state of the inorganic compound may be changed from a state at the time of the formation of the anode active material layer 22B. In this case, in the non-opposed region R2, the state of the anode active material layer 22B is kept in a state immediately after the formation without influence of charge and discharge. Therefore, in the case where the presence or absence of the inorganic compound is examined, it is preferable to examine the anode active material layer 22B in the non-opposed region R2, because the presence or absence of the inorganic compound is allowed to be reproducibly and accurately examined independent of charge-discharge history (such as the presence or absence of charge and discharge or the number of times of charge and discharge).

Separator

The separator 23 isolates between the cathode 21 and the anode 22 so that lithium ions pass therethrough while preventing a short circuit of a current due to contact between the cathode 21 and the anode 22. The separator 23 is configured of, for example, a porous film of a synthetic resin or ceramic, and may be configured of a laminate film formed by laminating two or more kinds of porous films. Examples of the synthetic resin include polytetrafluoroethylene, polypropylene, polyethylene and the like.

Electrolytic Solution

The separator 23 is impregnated with an electrolytic solution which is a liquid electrolyte. The electrolytic solution is formed by dissolving an electrolyte salt in a solvent, and may include any other material such as an additive, if necessary.

The solvent includes, for example, one kind or two or more kinds of nonaqueous solvents such as organic solvents. Examples of the nonaqueous solvent include ethylene carbonate, propylene carbonate, butylene carbonate, dimethyl carbonate, diethyl carbonate, ethyl methyl carbonate, methyl propyl carbonate, γ-butyrolactone, γ-valerolactone, 1,2-dimethoxyethane, tetrahydrofuran, 2-methyltetrahydrofuran, tetrahydropyran, 1,3-dioxolane, 4-methyl-1,3-dioxolane, 1,3-dioxane, 1,4-dioxane, methyl acetate, ethyl acetate, methyl propionate, ethyl propionate, methyl butyrate, methyl isobutyrate, methyl trimethylacetate, ethyl trimethylacetate, acetonitrile, glutaronitrile, adiponitrile, methoxyacetonitrile, 3-methoxypropionitrile, N,N-dimethylformamide, N-methylpyrrolidinone, N-methyloxazolidinone, N,N'-dimethylimidazolidinone, nitromethane, nitroethane, sulfolane, trimethyl phosphate and dimethyl sulfoxide, because good battery capacity, cycle characteristics and storage characteristics are obtained.

In particular, one or more kinds selected from the group consisting of ethylene carbonate, propylene carbonate, dimethyl carbonate, diethyl carbonate and ethyl methyl carbonate are preferable, because superior characteristics are obtained. In this case, a mixture of a high-viscosity (high dielectric constant) solvent (for example, specific inductive $\in \geq 30$) such as ethylene carbonate or propylene carbonate and a low-viscosity solvent (for example, viscosity≤1 mPa·s) such as dimethyl carbonate, ethyl methyl carbonate or diethyl carbonate is more preferable, because the dissociation property of the electrolyte salt and ion mobility are improved.

In particular, the solvent preferably includes one or both of a halogenated chain carbonate and a halogenated cyclic carbonate, because a stable coating is formed on a surface of the anode 22 during charge and discharge; therefore, the decomposition reaction of the electrolytic solution is prevented. The halogenated chain carbonate is a chain carbonate including a halogen as a constituent element (in which one or more hydrogen atoms are replaced with a halogen atom). The halogenated cyclic carbonate is a cyclic carbonate including a halogen as a constituent element (in which one or more hydrogen atoms are replaced with a halogen atom).

The kind of halogen is not specifically limited, but fluorine, chlorine or bromine is preferable, and fluorine is more preferable, because a higher effect than that of other halogens is obtained. The number of halogen atoms is more preferably 2 than 1, and may be 3 or over, because a capability of forming a protective film is improved, and a firmer and stabler coating is formed, so the decomposition reaction of the electrolytic solution is further prevented.

Examples of the halogenated chain carbonate include fluoromethyl methyl carbonate, bis(fluoromethyl) carbonate, difluoromethyl methyl carbonate and the like. Examples of the halogenated cyclic carbonate include 4-fluoro-1,3-dioxolane-2-one, 4,5-difluoro-1,3-dioxolane-2-one and the like. In the halogenated cyclic carbonate, a geometric isomer is included. The contents of the halogenated chain carbonate and the halogenated cyclic carbonate in the nonaqueous solvent is, for example, within a range of 0.01 wt % to 50 wt %.

Moreover, the solvent preferably includes an unsaturated carbon bond cyclic carbonate, because a stable coating is formed on a surface of the anode 22 during charge and discharge; therefore, the decomposition reaction of the electrolytic solution is prevented. The unsaturated carbon bond cyclic carbonate is a cyclic carbonate having an unsaturated carbon bond (in which an unsaturated carbon bond is introduced into a part). Examples of the unsaturated carbon bond cyclic carbonate include vinylene carbonate, vinyl ethylene carbonate and the like. The content of the unsaturated carbon bond cyclic carbonate in the solvent is, for example, within a range of 0.01 wt % to 10 wt %.

Moreover, the solvent preferably includes a sultone (a cyclic sulfonate), because chemical stability of the electrolytic solution is improved. Examples of the sultone include propane sultone, propene sultone and the like. The content of the sultone in the solvent is, for example, within a range of 0.5 wt % to 5 wt %.

Further, the solvent preferably includes an acid anhydride, because chemical stability of the electrolytic solution is improved. Examples of the acid anhydride include a carboxylic anhydride, a disulfonic anhydride, an anhydride of a carboxylic acid and a sulfonic acid, and the like. Examples of the carboxylic anhydride include succinic anhydride, glutaric anhydride, maleic anhydride, and the like. Examples of the disulfonic anhydride include ethanedisulfonic anhydride, propanedisulfonic anhydride, and the like. Examples of the anhydride of a carboxylic acid and a sulfonic acid include sulfobenzoic anhydride, sulfopropionic anhydride, sulfobutyric anhydride, and the like. The content of the acid anhydride in the solvent is, for example, within a range of 0.5 wt % to 5 wt %.

The electrolyte salt includes, for example, one kind or two or more kinds selected from light metal salts such as lithium salt. Examples of the lithium salt include lithium hexafluorophosphate ($LiPF_6$), lithium tetrafluoroborate ($LiBF_4$), lithium perchlorate ($LiClO_4$), lithium hexafluoroarsenate ($LiAsF_6$), lithium tetraphenyl borate ($LiB(C_6H_5)_4$), lithium methanesulfonate ($LiCH_3SO_3$), trifluoromethane sulfonic lithium ($LiCF_3SO_3$), lithium tetrachloroaluminate ($LiAlCl_4$), lithium silicate hexafluoride ($Li_2SiF_6$), lithium chloride ($LiCl$) and lithium bromide ($LiBr$), because good battery capacity, cyclic characteristics, storage characteristics and the like are obtained.

In particular, one kind or two or more kinds selected from the group consisting of lithium hexafluorophosphate, lithium tetrafluoroborate, lithium perchlorate and lithium hexafluoroarsenate are preferable. More specifically, lithium hexafluorophosphate and lithium tetrafluoroborate are preferable, and lithium hexafluorophosphate is more preferable, because internal resistance is reduced to thereby obtain superior characteristics.

The content of the electrolyte salt is preferably within a range of 0.3 mol/kg to 3.0 mol/kg both inclusive relative to the solvent, because high ionic conductivity is obtained.

Operation of Prismatic Type Secondary Battery

When the prismatic secondary battery is charged, for example, lithium ions extracted from the cathode 21 are inserted into the anode 22 through the electrolytic solution. On the other hand, when the prismatic type secondary battery is discharged, for example, lithium ions extracted from the anode 22 are inserted into the cathode 21 through the electrolytic solution.

Method of Manufacturing Prismatic Type Secondary Battery

The secondary battery is manufactured by, for example, the following steps.

First of all, the cathode 21 is formed. First, the cathode active material and, if necessary, the cathode binder, the cathode conductor and the like are mixed to form a cathode mixture, and then the cathode mixture is dispersed in an organic solvent or the like to form paste-form cathode mixture slurry. Next, the cathode mixture slurry is applied to the cathode current collector 21A by a coating apparatus such as a doctor blade or a bar coater, and the cathode mixture slurry is dried to form the cathode active material layer 21B. Finally, the cathode active material layer 21B is compression molded by a roller press or the like while applying heat, if necessary. In this case, compression molding may be repeated a plurality of times.

Next, the anode active material layer 22B is formed on the anode current collector 22A by the same forming steps as the steps of forming the above-described anode for lithium-ion secondary battery to form the anode 22.

Next, the battery element 20 is formed. First, the cathode lead 24 and the anode lead 25 are attached to the cathode current collector 21A and the anode current collector 22A, respectively, by a welding method or the like. Then, the cathode 21 and the anode 22 are laminated with the separator 23 in between, and they are spirally wound in a longitudinal direction to form a spirally wound body. Finally, the spirally wound body is molded so as to have a flat shape.

Finally, the prismatic type secondary battery is assembled. First, the battery element 20 is contained in the battery can 11, and then the insulating plate 12 is placed on the battery element 20. Next, the cathode lead 24 and the anode lead 25 are attached to the cathode pin 15 and the battery can 11, respectively, by a welding method or the like. In this case, the battery cover 13 is fixed to an open end of the battery can 11 by a laser welding method or the like. Finally, the electrolytic solution is injected into the battery can 11 from the injection hole 19 so as to impregnate the separator 23 with the electrolytic solution, and then the injection hole 19 is sealed with the sealing member 19A.

Functions and Effects of Prismatic Type Secondary Battery

In the prismatic type secondary battery, as the anode 22 has the same configuration as that of the above-described anode for lithium-ion secondary battery, the decomposition reaction of the electrolytic solution during charge and discharge is prevented. Therefore, cycle characteristics and initial charge-discharge characteristics are allowed to be improved. Other effects are the same as those of the anode for lithium-ion secondary battery.

2-2. Cylindrical Type

Figure 9:
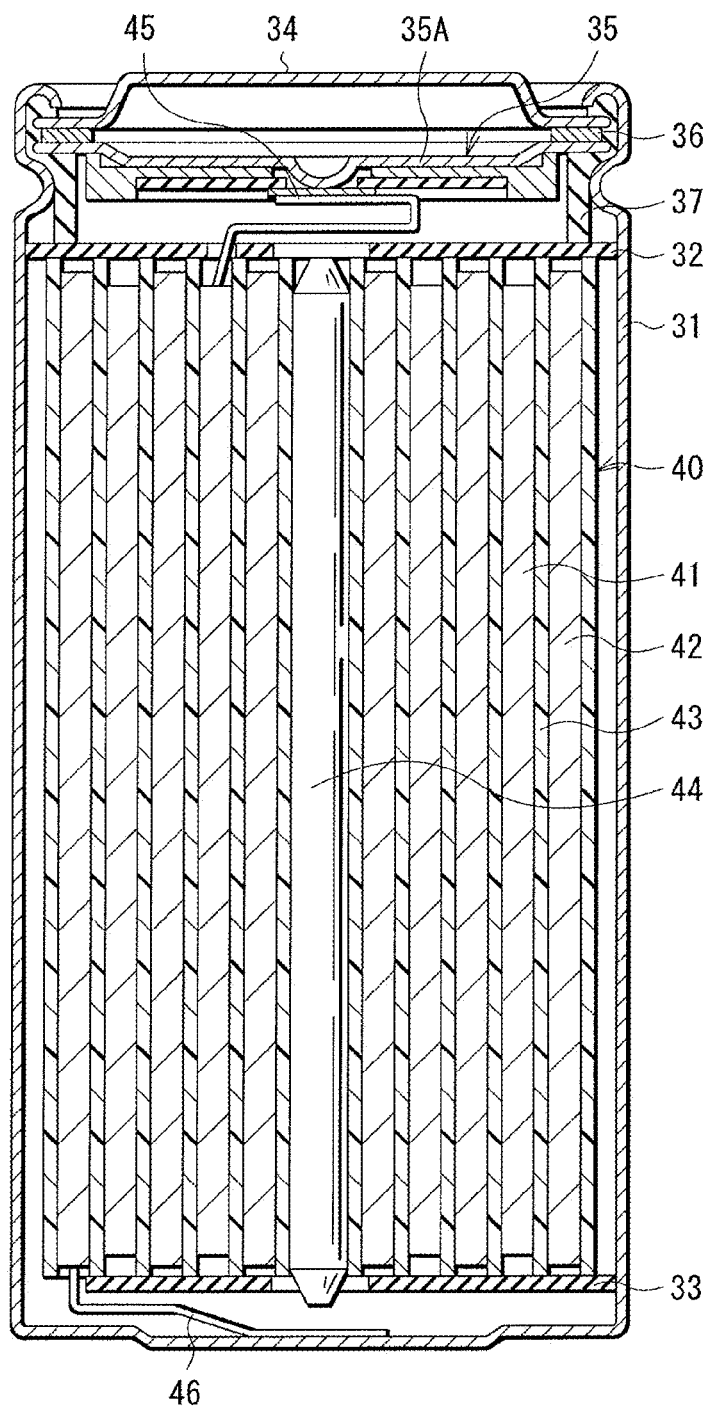
FIG. 9 is a sectional view illustrating a configuration of a cylindrical type secondary battery using the anode for lithium-ion secondary battery according to the embodiment of the invention.
Figure 10:
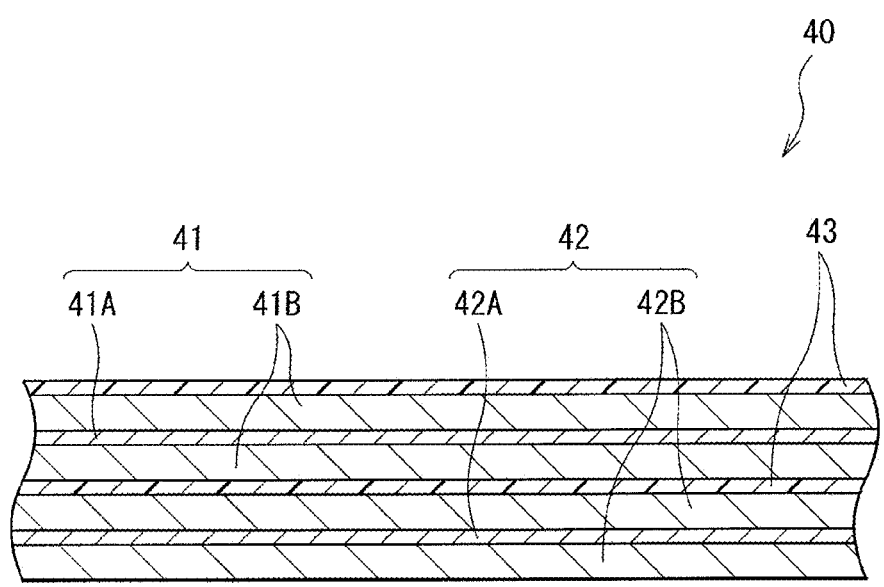
FIG. 10 is an enlarged sectional view illustrating a part of a spirally wound electrode body illustrated in FIG. 9.

FIGS. 9 and 10 illustrate sectional configurations of a cylindrical type secondary battery, and FIG. 10 illustrates an enlarged view of a part of a spirally wound electrode body 40 illustrated in FIG. 9. The cylindrical type secondary battery will be described below referring to components of the above-described prismatic type secondary battery as necessary.

Configuration of Cylindrical Type Secondary Battery

The cylindrical type secondary battery mainly includes the spirally wound electrode body 40 and a pair of insulating plates 32 and 33 which are contained in a substantially hollow cylindrical-shaped battery can 31. The spirally wound electrode body 40 is a spirally wound laminate formed by laminating and spirally winding a cathode 41 and an anode 42 with a separator 43 in between.

The battery can 31 has a hollow configuration in which an end of the battery can 31 is closed and the other end thereof is opened, and the battery can 31 is made of, for example, the same material as that of the battery can 11. The pair of insulating plates 32 and 33 are arranged so that the spirally wound electrode body 40 is sandwiched therebetween at the top and the bottom of the spirally wound electrode body 40, and the pair of insulating plates 32 and 33 extend in a direction perpendicular to a peripheral winding surface.

In the open end of the battery can 31, a battery cover 34, and a safety valve mechanism 35 and a positive temperature coefficient device (PTC device) 36 are caulked by a gasket 37, and the battery can 31 is sealed. The battery cover 34 is made of, for example, the same material as that of the battery can 31. The safety valve mechanism 35 and the PTC device 36 are arranged inside the battery cover 34, and the safety valve mechanism 35 is electrically connected to the battery cover 34 through the PTC device 36. In the safety valve mechanism 35, when an internal pressure in the secondary battery increases to a certain extent or higher due to an internal short circuit or external application of heat, a disk plate 35A is flipped so as to disconnect the electrical connection between the battery cover 34 and the spirally wound electrode body 40. The PTC device 36 increases resistance with an increase in temperature to prevent abnormal heat generation caused by a large current. The gasket 37 is made of, for example, an insulating material, and its surface may be coated with asphalt.

A center pin 44 may be inserted into the center of the spirally wound electrode body 40. A cathode lead 45 made of a conductive material such as aluminum is connected to the cathode 41, and an anode lead 46 made of a conductive material such as nickel is connected to the anode 42. The cathode lead 45 is electrically connected to the battery cover 34 by welding or the like to the safety valve mechanism 35, and the anode lead 46 is electrically connected to the battery can 31 by welding or the like.

The cathode 41 includes, for example, a cathode active material layer 41B on both surfaces of a cathode current collector 41A. The anode 42 has the same configuration as that of the above-described anode for lithium-ion secondary battery, and includes, for example, an anode active material layer 42B on both surfaces of an anode current collector 42A. The configurations of the cathode current collector 41A, the cathode active material layer 41B, the anode current collector 42A, the anode active material layer 42B and the separator 43 are the same as those of the cathode current collector 21A, the cathode active material layer 21B, the anode current collector 22A, the anode active material layer 22B and the separator 23, respectively. Moreover, the composition of the electrolytic solution with which the separator 35 is impregnated is the same as that of the electrolytic solution in the prismatic type secondary battery.

Operation of Cylindrical Type Secondary Battery

When the cylindrical type secondary battery is charged, for example, lithium ions extracted from the cathode 41 are inserted into the anode 42 through the electrolytic solution. On the other hand, when the cylindrical type secondary battery is discharged, for example, lithium ions extracted from the anode 42 are inserted into the cathode 41 through the electrolytic solution.

Method of Manufacturing Cylindrical Type Secondary Battery

The cylindrical type secondary battery is manufactured by, for example, the following steps. First, by the same steps as the steps of forming the cathode 21 and the anode 22, the cathode active material layer 41B is formed on both surfaces of the cathode current collector 41A to form the cathode 41, and the anode active material layer 42B is formed on both surfaces of the anode current collector 42A to form the anode 42. Next, the cathode lead 45 and the anode lead 46 are attached to the cathode 41 and the anode 42, respectively, by a welding method or the like. Then, the cathode 41 and the anode 42 are laminated with the separator 43 in between and are spirally wound to form the spirally wound electrode body 40, and then the center pin 44 is inserted into the center of the spirally wound electrode body 40. Next, the spirally wound electrode body 40 sandwiched between the pair of insulating plates 32 and 33 is contained in the battery can 31. In this case, the cathode lead 45 and an end of the anode lead 46 are attached to the safety valve mechanism 35 and the battery can 31, respectively, by a welding method or the like. Next, the electrolytic solution is injected into the battery can 31, and the separator 43 is impregnated with the electrolytic solution. Finally, the battery cover 34, the safety valve mechanism 35 and the PTC device 36 are mounted in an open end of the battery can 31, and then they are caulked by the gasket 37.

Functions and Effects of Cylindrical Type Secondary Battery

In the cylindrical type secondary battery, the anode 42 has the same configuration as that of the above-described anode for lithium-ion secondary battery. Therefore, cycle characteristics and initial charge-discharge characteristics are allowed to be improved by the same reasons as those in the prismatic type secondary battery. Effects other than this are the same as those in the anode for lithium-ion secondary battery.

2-3. Laminate Film Type

Figure 11:
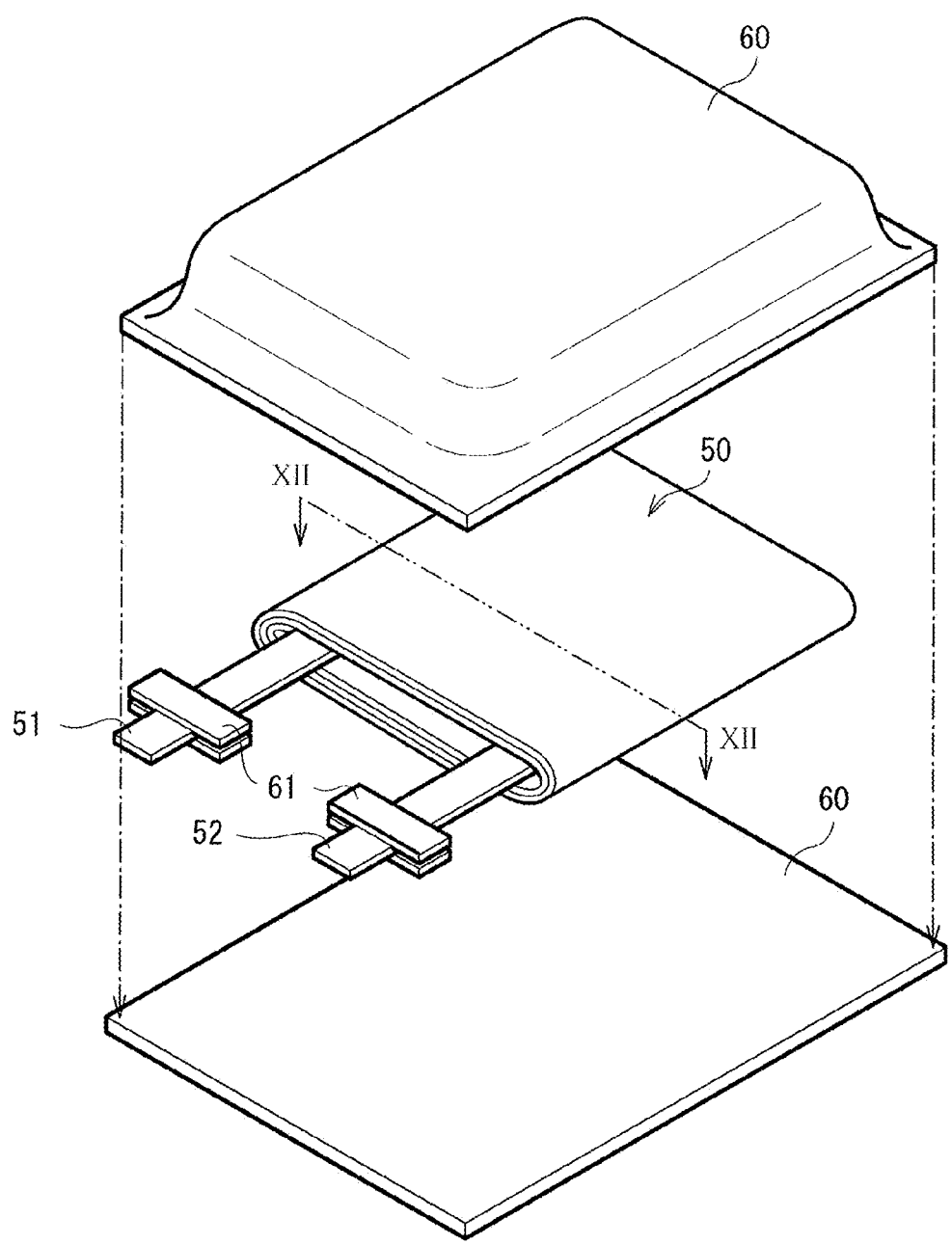
FIG. 11 is an exploded perspective view illustrating a configuration of a laminate film type secondary battery using the anode for lithium-ion secondary battery according to the embodiment of the invention.
Figure 12:
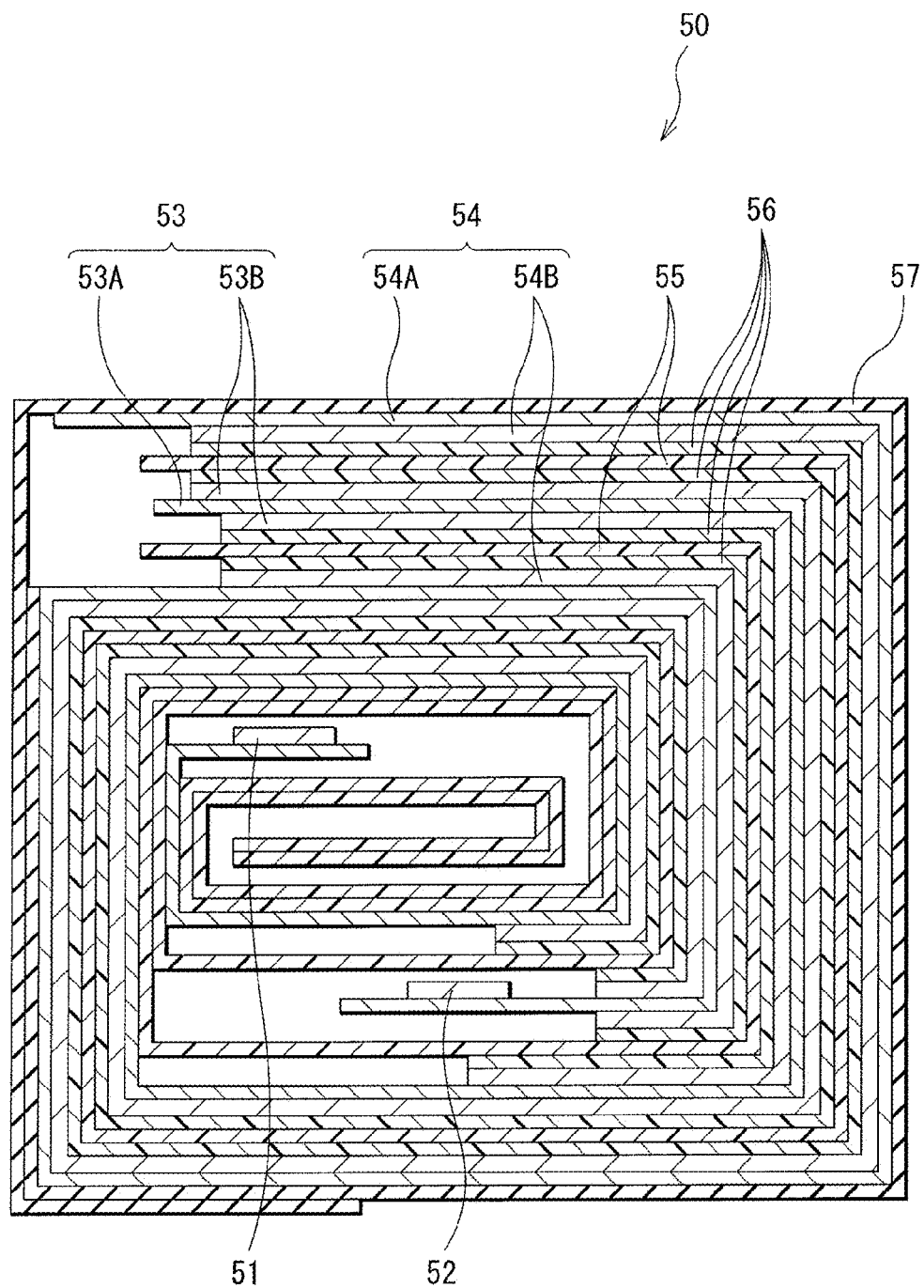
FIG. 12 is a sectional view taken along a line XII-XII of a spirally wound electrode body illustrated in FIG. 11.

FIG. 11 illustrates an exploded perspective configuration of a laminate film type secondary battery, and FIG. 12 illustrates an enlarged sectional view taken along a line XII-XII of a spirally wound electrode body 50 illustrated in FIG. 11.

Configuration of Laminate Film Type Secondary Battery

In the laminate film type secondary battery, the spirally wound electrode body 50 is mainly contained in film-shaped package members 60. The spirally wound electrode body 50 is a spirally wound laminate formed by laminating and spirally winding the cathode 53 and the anode 54 with a separator 55 and an electrolyte layer 56 in between. A cathode lead 51 and an anode lead 52 are attached to the cathode 53 and the anode 54, respectively. An outermost part of the spirally wound electrode body 50 is protected with a protective tape 57.

The cathode lead 51 and the anode lead 52 are drawn, for example, from the interiors of the package members 60 to outside in the same direction. The cathode lead 51 is made of a conductive material such as aluminum, and the anode lead 52 is made of a conductive material such as copper, nickel or stainless. These materials each have a sheet shape or a mesh shape.

The package members 60 are laminate films in which a bonding layer, a metal layer and a surface protection layer are laminated in this order. In the laminate films, for example, edge portions of the bonding layers of two laminate films are adhered to each other by fusion bonding or an adhesive so that the bonding layers face the spirally wound electrode body 50. The bonding layer is a film of polyethylene, polypropylene or the like. The metal layer is aluminum foil or the like. The surface protection layer is a film of nylon, polyethylene terephthalate or the like.

In particular, as the package members 60, aluminum laminate films each formed by laminating a polyethylene film, aluminum foil and a nylon film in this order are preferable. However, the package members 60 may be laminate films with any other laminate configuration or a polymer film of polypropylene or the like or a metal film.

Adhesive films 61 for preventing the entry of outside air are inserted between each package member 60 and the cathode lead 51 and between each package member 60 and the anode lead 52. The adhesive films 61 are made of, for example, a material having adhesion to the cathode lead 51 and the anode lead 52. Examples of such a material include polyolefin resins such as polyethylene, polypropylene, modified polyethylene and modified polypropylene.

The cathode 53 includes, for example, a cathode active material layer 53B on both surfaces of a cathode current collector 53A. The anode 54 has the same configuration as that of the above-described anode for lithium-ion secondary battery, and includes, for example, an anode active material layer 54B on both surfaces of an anode current collector 54A. The configurations of the cathode current collector 53A, the cathode active material layer 53B, the anode current collector 54A and the anode active material layer 54B are the same as those of the cathode current collector 21A, the cathode active material layer 21B, the anode current collector 22A and the anode active material layer 22B, respectively. Moreover, the configuration of the separator 55 is the same as that of the separator 23.

The electrolyte layer 56 is formed by holding an electrolytic solution by a polymer compound, and may include any other material such as an additive if necessary. The electrolyte layer 56 is a so-called gel electrolyte. The gel electrolyte is preferable, because the gel electrolyte is allowed to obtain high ionic conductivity (for example, 1 mS/cm or over at room temperature), and leakage of the electrolytic solution from the battery is prevented.

As the polymer compound, for example, one kind or two or more kinds are selected from the following polymer materials. The polymer materials include polyacrylonitrile, polyvinylidene fluoride, polytetrafluoroethylene, polyhexafluoropropylene, polyethylene oxide, polypropylene oxide, polyphosphazene, polysiloxane, polyvinyl fluoride, polyvinyl acetate, polyvinyl alcohol, poly(methyl methacrylate), polyacrylic acids, polymethacrylic acids, styrene-butadiene rubber, nitrile-butadiene rubber, polystyrene, polycarbonate, a copolymer of vinylidene fluoride and hexafluoropyrene, and the like. In particular, polyvinylidene fluoride or the copolymer of vinylidene fluoride and hexafluoropyrene is preferable, because they are electrochemically stable.

The composition of the electrolytic solution is, for example, the same as that of the electrolytic solution in the prismatic type secondary battery. However, in the electrolyte layer 56 which is a gel electrolyte, the solvent of the electrolytic solution means a wide concept including not only a liquid solvent but also a material having ionic conductivity which is allowed to dissociate an electrolyte salt. Therefore, in the case where a polymer compound having ionic conductivity is used, the polymer compound is included in the concept of the solvent.

Instead of the gel electrolyte layer 56, the electrolytic solution may be used as it is. In this case, the separator 55 may be impregnated with the electrolytic solution.

Operation of Laminate Film Type Secondary Battery

When the laminate film type secondary battery is charged, for example, lithium ions extracted from the cathode 53 are inserted into the anode 54 through the electrolyte layer 56. On the other hand, when the laminate film type secondary battery is discharged, for example, lithium ions extracted from the anode 54 are inserted into the cathode 53 through the electrolyte layer 56.

Method of Manufacturing Laminate Film Type Secondary Battery

The laminate film type secondary battery including the gel electrolyte layer 56 is manufactured by, for example, the following three kinds of methods.

In a first method, first, by the same steps as those in the above-described steps of forming the cathode 21 and the anode 22, the cathode 53 and the anode 54 are formed. In this case, the cathode active material layer 53B is formed on both surfaces of the cathode current collector 53A to form the cathode 53, and the anode active material layer 54B is formed on both surfaces of the anode current collector 54A to form the anode 54. Next, a precursor solution including the electrolytic solution, the polymer compound, the organic solvent and the like is prepared, and then the cathode 53 and the anode 54 are coated with the precursor solution to form the gel electrolyte layer 56. Next, the cathode lead 51 and the anode lead 52 are attached to the cathode current collector 53A and the anode current collector 54A, respectively, by a welding method or the like. Then, the cathode 53 on which the electrolyte layer 56 is formed and the anode 54 on which the electrolyte layer 56 is formed are laminated and spirally wound with the separator 55 in between to form the spirally wound electrode body 50, and then the protective tape 57 is bonded to an outermost part of the spirally wound electrode body 50. Finally, the spirally wound electrode body 50 is sandwiched between two film-shaped package members 60, and edge portions of the package members 60 are adhered to each other by a thermal fusion bonding method or the like to seal the spirally wound electrode body 50 in the package members 60. In this case, the adhesive films 61 are inserted between the cathode lead 51 and each package member 60 and between the anode lead 52 and each package member 60.

In a second method, first, the cathode lead 51 and the anode lead 52 are attached to the cathode 53 and the anode 54, respectively. Next, the cathode 53 and the anode 54 are laminated and spirally wound with the separator 55 in between to form a spirally wound body as a precursor body of the spirally wound electrode body 50, and then the protective tape 57 is bonded to an outermost part of the spirally wound body. Then, the spirally wound body is sandwiched between two film-shaped package members 60, and the edge portions of the package members 60 except for edge portions on one side are adhered by a thermal fusion bonding method or the like to contain the spirally wound body in the package members 60 configuring a pouched package. Next, an electrolytic composition which includes the electrolytic solution, monomers as materials of a polymer compound and a polymerization initiator and, if necessary, any other material such as a polymerization inhibitor is prepared, and is injected into the package members 60 configuring the pouched package, and then an opened portion of the pouched package configured of the package members 60 is sealed by a thermal fusion bonding method or the like. Finally, the monomers are polymerized by applying heat to form the polymer compound, and the gel electrolyte layer 56 is formed.

In a third method, as in the case of the above-described second method, the spirally wound body is formed, and the spirally wound body is contained in the package members 60 configuring the pouched package, except that the separator 55 having both surfaces coated with a polymer compound is used. Examples of the polymer compound applied to the separator 55 include polymers (a homopolymer, a copolymer, a multicomponent copolymer, and the like) including vinylidene fluoride as a component. More specifically, examples of the polymer compound include polyvinylidene fluoride, a binary copolymer including vinylidene fluoride and hexafluoropropylene as components, a ternary copolymer including vinylidene fluoride, hexafluoropropylene and chlorotrifluoroethylene as components. The polymer compound may include one kind or two or more kinds of other polymer compounds in addition to the polymer including vinylidene fluoride as a component. Next, the electrolytic solution is prepared, and injected into the package members 60, and then an opened portion of a pouched package configured of the package members 60 is sealed by a thermal fusion bonding method or the like. Finally, the package members 60 are heated while being weighted so that the separator 55 is brought into close contact with the cathode 53 and the anode 54 with the polymer compound in between. The polymer compound is thereby impregnated with the electrolytic solution, and the polymer compound is gelatinized to form the electrolyte layer 56.

In the third method, compared to the first method, swelling of the secondary battery is prevented. Moreover, in the third method, compared to the second method, monomers as the materials of the polymer compound, the organic solvent and the like hardly remain in the electrolyte layer 56, and a step of forming the polymer compound is controlled well; therefore, sufficient adhesion between the cathode 53, anode 54 and the separator 55, and the electrolyte layer 56 is obtained.

Functions and Effects of Laminate Film Type Secondary Battery

In the laminate film type secondary battery, the anode 54 has the same configuration as that of the above-described anode for lithium-ion secondary battery. Therefore, cycle characteristics and initial charge-discharge characteristics are allowed to be improved because of the same reasons as those in the prismatic type secondary battery. Effects other than this are the same as those in the anode for lithium-ion secondary battery.

3. Application of Secondary Battery

Next, application examples of the above-described lithium-ion secondary battery will be described below.

The application of the lithium-ion secondary battery is not specifically limited as long as the lithium-ion secondary battery is applied to machines, devices, appliances, apparatuses, systems (combinations of a plurality of devices) and the like which are allowed to use the lithium-ion secondary battery as a power supply for drive or a power storage source for accumulation of power. In the case where the lithium-ion secondary battery is used as a power supply, the power supply may be a main power supply (a power supply to be preferentially used) or an auxiliary power supply (a power supply to be used instead of the main power supply or by switching from the main power supply). The kind of the main power supply is not limited to the lithium-ion secondary battery.

The lithium-ion secondary battery is applied to, for example, the following applications. The applications include portable electronic devices such as video cameras, digital still cameras, cellular phones, notebook personal computers, cordless telephones, headphone stereos, portable radios, portable televisions and personal digital assistants (PDAs), portable home appliances such as electric shavers, memory devices such as backup power supplies and memory cards, power tools such as electric drills and electric saws, medical electronic devices such as pacemakers and hearing aids, vehicles such as electric vehicles (including hybrid vehicles), and energy storage system such as household battery systems storing power in case of emergency or the like. The lithium-ion secondary battery may be applied to any applications other than the above-described applications.

In particular, the lithium-ion secondary battery is effectively applied to the power tools, the electric vehicles, the energy storage systems and the like, because they need good battery characteristics (cycle characteristics, storage characteristics, load characteristics and the like), so when the lithium-ion secondary battery according to the embodiment of the invention is used, the characteristics are allowed to be effectively improved. Note that the power tools are tools having a moving part (such as a drill) which is movable by using the lithium-ion secondary battery as a power supply for drive. The electric vehicles are vehicles operating (running) by using the lithium-ion secondary battery as a power supply for drive, and as described above, the electric vehicles may include vehicles (such as hybrid vehicles) including a driving source in addition to the lithium-ion secondary battery. The energy storage systems are systems using the lithium-ion secondary battery as a power storage source. For example, in a household energy storage system, power is stored in the lithium-ion secondary battery which is a power storage source, and the power is consumed when necessary, so various devices such as home appliances are allowed to be used.

EXAMPLES

Examples of the invention will be described in detail below.

Experimental Examples 1-1 to 1-24

The laminate film type secondary batteries illustrated in FIGS. 11 and 12 were formed by the following steps.

First of all, the cathode 53 was formed. First, 91 parts by mass of the cathode active material (lithium cobalt complex oxide: $LiCoO_2$), 6 parts by mass of the cathode conductor (graphite) and 3 parts by mass of the cathode binder (polyvinylidene fluoride: PVDF) were mixed to form a cathode mixture. Next, the cathode mixture was dispersed in the organic solvent (N-methyl-2-pyrrolidone: NMP) to form paste-form cathode mixture slurry. Then, the cathode mixture slurry was applied to both surfaces of the cathode current collector 53A by a coating apparatus, and the cathode mixture slurry was dried to form the cathode active material layer 53B. In this case, as the cathode current collector 53A, strip-shaped aluminum foil (with a thickness of 12 μm) was used. Finally, the cathode active material layer 53B was compression molded by a roller press. When the cathode active material layer 53B was formed, the thickness of the cathode active material layer 53B was adjusted so as to prevent lithium metal from being deposited on the anode 54 in a fully-charged state.

Next, the anode 54 was formed. First, a plurality of particulate anode active materials were formed by spraying an anode material (silicon powder) in a molten state or a semi-molten state to both surfaces of the anode current collector 54A by a spray method (a gas frame spraying method). In this case, as the anode current collector 54A, strip-shaped roughened electrolytic copper foil (with a thickness of 15 μm) was used. Conditions of the spraying method were as follows. As the silicon powder, pulverized particles (with a median size of 1 μm to 300 μm) of high-purity single-crystal silicon with a purity of 99.99% were used, and the anode material was sprayed while the anode current collector 54A was cooled by a carbon dioxide gas. A mixed gas of hydrogen ($H_2$) and oxygen ($O_2$) (with a hydrogen/oxygen volume ratio of 2:1) and a nitrogen gas ($N_2$) were used as the spray gas and as a material supply gas, respectively, and the spray rate was within a range of approximately 45 msec to 55 msec. In this case, the amount of the material supply gas was adjusted to control a material charge amount per unit time. Next, each of alkoxysilane compounds illustrated in Table 1 was dissolved in ethanol to prepare a processing solution (with a concentration of 10%). Then, the anode current collector 54A on which the anode active material was formed was immersed in the processing solution for 1 minute, and then the anode current collector 54A was taken out and dried so as to form the inorganic compound. In this case, conditions for forming the inorganic compound were changed to control the presence or absence of the alkoxysilane compound (a non-hydrolysate) and a hydrolysate. When the hydrolysate was formed, the inorganic compound was formed in a tank with a humidity of approximately 20%, and the humidity was changed if necessary to adjust the amount of water (the amount of the formed hydrolysate) in the inorganic compound. In the case where the hydrolysate was not formed, the inorganic compound was formed by the same steps as those in the case where the hydrolysate was formed, and then water (the hydrolysate) in the inorganic compound was removed by forced heating in a high-temperature vacuum environment (at a heating temperature of 60° C. for a heating time of 12 hours). The "presence" of the hydrolysate means that a part of the alkoxysilane compound was hydrolyzed, and the "absence" of the hydrolysate means that the whole alkoxysilane compound was hydrolyzed.

Next, the solvents (ethylene carbonate (EC) and diethyl carbonate (DEC)) were mixed, and the electrolyte salt (lithium hexafluorophosphate: $LiPF_6$) was dissolved in the mixed solvent to prepare the electrolytic solution. At that time, the composition of the mixed solvent (EC:DEC) was 50:50 at a weight ratio, and the content of the electrolyte salt was 1 mol/kg relative to the solvent.

Finally, the secondary battery was assembled. First, the cathode lead 51 made of aluminum was welded to an end of the cathode current collector 53A, and the anode lead 52 made of nickel was welded to an end of the anode current collector 54A. Next, the cathode 53, the separator 55, the anode 54 and the separator 55 were laminated in this order and were spirally wound in a longitudinal direction to form a spirally wound body as a precursor body of the spirally wound electrode body 50, and then an outermost part of the spirally wound body was fixed by the protective tape 57 (an adhesive tape). In this case, as the separator 55, a laminate film (with a thickness of 20 μm) in which a film including porous polyethylene as a main component was sandwiched between films including porous polypropylene as a main component was used. Next, the spirally wound body was sandwiched between the package members 60, and then the edge portions of the package members 60 except for edge portions on one side were adhered by thermal fusion bonding to form a pouched package, and the spirally wound body was contained in the package members 60 configuring the pouched package. In this case, as the package members 60, aluminum laminate films each formed by laminating a nylon film (with a thickness of 30 μm), aluminum foil (with a thickness of 40 μm) and a cast polypropylene film (with a thickness of 30 μm) in order from outside were used. Next, the electrolytic solution was injected from an opened portion of the pouched package configured of the package members 60, and the separator 55 was impregnated with the electrolytic solution to form the spirally wound electrode body 50. Finally, the opened portion of the pouched package configured of the package members 60 was sealed by thermal fusion bonding in a vacuum atmosphere.

Experimental Examples 2-1 to 2-16

Secondary batteries were formed by the same steps as those in Experimental Examples 1-1, 1-2, 1-23 and 1-24, except that as illustrated in Table 2, the kind of the anode active material and the method of forming the anode active material were changed.

In the case where an evaporation method (an electron beam evaporation method) was used, a deflective electron beam evaporation source (silicon with a purity of 99%) was used, and the deposition rate was 100 nm/sec. In this case, pressure was brought in a vacuum state of $1 \times 10^{-3}$ Pa by a turbomolecular pump.

In the case where a coating method was used, first, the anode active material (silicon powder with a median size of 0.2 μm to 40 μm) and a precursor of the anode binder (an NMP solution of a polyamic acid) were mixed at a dry weight ratio of 80:20, and then the mixture was diluted with NMP to obtain paste-form anode mixture slurry. Next, the anode mixture slurry was applied to both surfaces of the anode current collector 54A by a coating apparatus, and the anode mixture slurry was dried, and fired in a vacuum atmosphere at 400° C. for 1 hour to form the anode binder (polyimide).

In the case where silicon oxide ($SiO_x$: $0.1<x<1.5$) was used, the same steps as those in the case where the coating method was used were performed, except that silicon oxide powder was used as the anode active material.

In the case where a tin-cobalt alloy (SnCo) was used, first, tin-cobalt alloy powder was formed by a gas atomization method, and then the tin-cobalt alloy powder was pulverized and classified until its median size reached 15 μm. In this case, the Sn/Co atom number ratio in the tin-cobalt alloy was Sn:Co=80:20. Next, 75 parts by weight of the anode active material (the tin-cobalt alloy powder), 20 parts by weight of the anode conductor (flake graphite), 3 parts by weight of the anode binder (styrene-butadiene rubber), 2 parts by weight of a thickener (carboxymethylcellulose) were mixed and purely dispersed to form anode mixture slurry. Next, the anode mixture slurry was applied to both surfaces of the anode current collector 54A by a coating apparatus, and the anode mixture slurry was dried.

Experimental Examples 3-1 to 3-13

Secondary batteries were formed by the same steps as those in Experimental Examples 1-1 to 1-24, except that as illustrated in Table 3, the inorganic compound was not formed, or as a material of the inorganic compound, a material other than the alkoxysilane compounds was used. Fluorine resins 1 to 6 had a basic structure represented by a formula (4), and were compounds including, as X, groups represented by formulas (4-1) to (4-6), respectively.

$$X-CF_2-[O-CF_2-CF_2]_p-[O-CF_2]_q-O-CF_2-X \quad (4)$$

$$-Si(OCH_2CH_3)_3 \quad (4\text{-}1)$$

$$-CH_2OH \quad (4\text{-}2)$$

$$-CH_2(OCH_2CH_2)_2OH \quad (4\text{-}3)$$

$$-CH_2OCH_2CH(OH)CH_2OH \quad (4\text{-}4)$$

$$-COOCH_3 \quad (4\text{-}5)$$

$$-CH_2OPO(OH)_2 \quad (4\text{-}6)$$

When the cycle characteristics and the initial charge-discharge characteristics of the secondary batteries were determined, results illustrated in Tables 1 to 3 were obtained.

To determine the cycle characteristics, one cycle of charge and discharge was performed on each of the secondary batteries in an atmosphere of 23° C. to stabilize its battery state, and then another cycle of charge and discharge was performed to determine the discharge capacity. Next, the cycle of charge and discharge was repeated until the total cycle number reached 100 cycles to determine the discharge capacity. Finally, a capacity retention ratio (%)=(discharge capacity in the 100th cycle/discharge capacity in the second cycle)×100 was determined by calculation. As the conditions of charge, each of the secondary batteries was charged at a constant current density of 3 mA/cm² until the voltage reached 4.2 V, and then each of the secondary batteries was charged at a constant voltage of 4.2 V until the current density reached 0.3 mA/cm². As the conditions of discharge, each of the secondary batteries was discharged at a constant current density of 3 mA/cm² until the voltage reached 2.5 V.

To determine the initial charge-discharge characteristics, one cycle of charge and discharge was performed on each of the secondary batteries to stabilize its battery state. Next, each of the secondary batteries was charged again to determine the charge capacity, and then each of the secondary batteries was discharged to determine the discharge capacity. Finally, initial efficiency (%)=(discharge capacity/charge capacity)×100 was determined by calculation. The atmospheric temperature and the conditions of charge and discharge were the same as those in the case where the cycle characteristics were determined.

TABLE 1

| | | | Anode Active Material Layer | | | |
|---|---|---|---|---|---|---|
| | Anode Active Material | | Other | | Capacity Retention | Initial Efficiency |
| Table 1 | (Forming method) | Kind | Non-hydrolysate | Hydrolysate | Ratio (%) | (%) |
| Experimental Example 1-1 | Si | methyltrimethoxysilane | Included | Not included | 75 | 85 |
| Experimental Example 1-2 | (Spray | | Included | Included | 81 | 85 |
| Experimental Example 1-3 | method) | ethyltrimethoxysilane | Included | Not included | 74 | 85 |
| Experimental Example 1-4 | | | Included | Included | 81 | 86 |

TABLE 1-continued

| Table 1 | Anode Active Material Layer | | | | Capacity Retention Ratio (%) | Initial Efficiency (%) |
|---|---|---|---|---|---|---|
| | Anode Active Material (Forming method) | Other | | | | |
| | | Kind | Non-hydrolysate | Hydrolysate | | |
| Experimental Example 1-5 | | methyltriethoxysilane | Included | Not included | 75 | 85 |
| Experimental Example 1-6 | | | Included | Included | 82 | 86 |
| Experimental Example 1-7 | | methyltriisopropoxysilane | Included | Not included | 73 | 85 |
| Experimental Example 1-8 | | | Included | Included | 82 | 85 |
| Experimental Example 1-9 | | methyltributoxysilane | Included | Not included | 76 | 86 |
| Experimental Example 1-10 | | | Included | Included | 82 | 86 |
| Experimental Example 1-11 | | propyltrimethoxysilane | Included | Not included | 73 | 85 |
| Experimental Example 1-12 | | | Included | Included | 81 | 85 |
| Experimental Example 1-13 | | dimethyldimethoxysilane | Included | Not included | 75 | 86 |
| Experimental Example 1-14 | | | Included | Included | 83 | 86 |
| Experimental Example 1-15 | | phenyltrimethoxysilane | Included | Not included | 73 | 85 |
| Experimental Example 1-16 | | | Included | Included | 80 | 85 |
| Experimental Example 1-17 | | diphenyldimethoxysilane | Included | Not included | 75 | 86 |
| Experimental Example 1-18 | | | Included | Included | 82 | 86 |
| Experimental Example 1-19 | | phenylmethyldimethoxysilane | Included | Not included | 75 | 85 |
| Experimental Example 1-20 | | | Included | Included | 83 | 86 |
| Experimental Example 1-21 | | | Not included | Included | 85 | 86 |
| Experimental Example 1-22 | | methyltrimethoxysilane + | Included | Not included | 78 | 87 |
| Experimental Example 1-23 | | diphenyldimethoxysilane | Included | Included | 85 | 89 |
| Experimental Example 1-24 | | | Not included | Included | 88 | 88 |

TABLE 2

| Table 2 | Anode Active Material Layer | | | | Capacity Retention Ratio (%) | Initial Efficiency (%) |
|---|---|---|---|---|---|---|
| | Anode Active Material (Forming method) | Other | | | | |
| | | Kind | Non-hydrolysate | Hydrolysate | | |
| Experimental Example 2-1 | Si | methyltrimethoxysilane | Included | Not included | 74 | 85 |
| Experimental Example 2-2 | (Evaporation | | Included | Included | 80 | 85 |
| Experimental Example 2-3 | method) | methyltrimethoxysilane + | Included | Not included | 77 | 86 |
| Experimental Example 2-4 | | diphenyldimethoxysilane | Included | Included | 84 | 86 |
| Experimental Example 2-5 | Si | methyltrimethoxysilane | Included | Not included | 75 | 85 |
| Experimental Example 2-6 | (Coating | | Included | Included | 81 | 85 |
| Experimental Example 2-7 | method) | methyltrimethoxysilane + | Included | Not included | 77 | 85 |
| Experimental Example 2-8 | | diphenyldimethoxysilane | Included | Included | 85 | 86 |
| Experimental Example 2-9 | $SiO_x$ | methyltrimethoxysilane | Included | Not included | 74 | 82 |
| Experimental Example 2-10 | (Coating | | Included | Included | 81 | 83 |
| Experimental Example 2-11 | method) | methyltrimethoxysilane + | Included | Not included | 76 | 83 |
| Experimental Example 2-12 | | diphenyldimethoxysilane | Included | Included | 85 | 83 |
| Experimental Example 2-13 | SnCo | methyltrimethoxysilane | Included | Not included | 74 | 85 |
| Experimental Example 2-14 | (Coating | | Included | Included | 80 | 85 |
| Experimental Example 2-15 | method) | methyltrimethoxysilane + | Included | Not included | 75 | 86 |
| Experimental Example 2-16 | | diphenyldimethoxysilane | Included | Included | 84 | 86 |

TABLE 3

| Table 3 | Anode Active Material Layer | | Capacity Retention Ratio (%) | Initial Efficiency (%) |
|---|---|---|---|---|
| | Anode Active Material (Forming method) | Other | | |
| Experimental Example 3-1 | Si (Spray method) | — | 48 | 85 |
| Experimental Example 3-2 | Si (Evaporation method) | | 45 | 83 |
| Experimental Example 3-3 | Si (Coating method) | | 39 | 82 |
| Experimental Example 3-4 | $SiO_x$ (Coating method) | | 41 | 80 |
| Experimental Example 3-5 | SnCo (Coating method) | | 38 | 81 |
| Experimental Example 3-6 | Si (Spray method) | Polyimide | 55 | 76 |
| Experimental Example 3-7 | | Polyamide | 58 | 71 |
| Experimental Example 3-8 | | Fluorine resin 1 | 68 | 72 |
| Experimental Example 3-9 | | Fluorine resin 2 | 69 | 72 |
| Experimental Example 3-10 | | Fluorine resin 3 | 69 | 71 |
| Experimental Example 3-11 | | Fluorine resin 4 | 68 | 72 |
| Experimental Example 3-12 | | Fluorine resin 5 | 68 | 71 |
| Experimental Example 3-13 | | Fluorine resin 6 | 69 | 71 |

In the case where the alkoxysilane compound and the hydrolysate were formed, the capacity retention ratio and the initial efficiency were remarkably improved, compared to the case where they were not formed.

More specifically, in the case where polyimide, polyamide or a fluorine resin was formed, compared to the case where they were not formed, the capacity retention ratio was increased, but the initial efficiency was pronouncedly reduced. As a reason for this, it is considered that in the case where polyimide or polyamide is used, load characteristics are reduced, and in the case where the fluorine resin is used, lithium reacts with fluorine to form lithium fluoride (LiF). On the other hand, in the case where the alkoxysilane compound and the hydrolysate were formed, compared to the case where they were not formed, while the initial efficiency was maintained equal or higher, the capacity retention ratio was remarkably increased. Such a difference between the results indicates that impregnation ability of the alkoxysilane compound or the like (ease of entry of the alkoxysilane compound or the like into gaps in the anode active material layer 54B) is remarkably superior to the impregnation ability of polyimide or the like.

In particular, in the case where the alkoxysilane compound or the like was formed, when the hydrolysate was formed with the non-hydrolysate, and even when only the hydrolysate was formed, the capacity retention ratio was further increased.

Experimental Examples 4-1 to 4-8

Secondary batteries were formed by the same steps as those in Experimental Example 1-23, except that as illustrated in Table 4, the composition of the electrolytic solution was changed, and the cycle characteristics of the secondary batteries were determined. As the composition (weight ratio) of the solvent, the ratio of 4-fluoro-1,3-dioxolane-2-one (FEC) and DEC was 50:50, the ratio of EC:DEC:4,5-difluoro-1,3-dioxolane-2-one (DEEC) was 25:70:5. The content of vinylene carbonate (VC), vinyl ethylene carbonate (VEC), propane sultone (PRS), sulfobenzoic anhydride (SBAH) or sulfopropionic anhydride (SPAH) in the solvent was 1 wt %. As the content of the electrolytic salt relative to the solvent, the content of $LiPF_6$ was 0.9 mol/kg and the content of lithium tetrafluoroborate ($LiBF_4$) was 0.1 mol/kg.

TABLE 4

| Table 4 | Solvent | Electrolyte Salt | Capacity Retention Ratio (%) |
|---|---|---|---|
| Experimental Example 1-23 | EC + DEC | $LiPF_6$ | 85 |
| Experimental Example 4-1 | FEC + DEC | | 87 |
| Experimental Example 4-2 | EC + DEC + DFEC | | 86 |
| Experimental Example 4-3 | FEC + DEC    VC | | 87 |
| Experimental Example 4-4 | VEC | | 88 |
| Experimental Example 4-5 | PRS | | 88 |
| Experimental Example 4-6 | SBAH | | 86 |
| Experimental Example 4-7 | SPAH | | 88 |
| Experimental Example 4-8 | FEC + DEC | $LiPF_6$ + $LiBF_4$ | 87 |

A high capacity retention ratio was obtained independent of the composition of the electrolytic solution, and in particular, when another solvent (such as halogenated cyclic carbonate) or another electrolyte salt ($LiBF_4$) was used, the capacity retention ratio was further increased.

Experimental Examples 5-1 and 5-2

Secondary batteries were formed by the same steps as those in the Experimental Example 1-23, except that as illustrated in Table 5, the battery configuration was changed, and the cycle characteristics of the secondary batteries were determined. In the case where a prismatic type secondary battery was formed, a battery can made of aluminum or iron was used.

TABLE 5

| Table 5 | Battery Configuration | Capacity Retention Ratio (%) |
|---|---|---|
| Experimental Example 1-23 | Laminate film type | 85 |
| Experimental Example 5-1 | Prismatic type (Al) | 88 |
| Experimental Example 5-2 | Prismatic type (Fe) | 90 |

A high capacity retention ratio was obtained independent of the battery configuration, and in particular, in the prismatic type secondary battery, more specifically in the prismatic type secondary battery having a battery can made of iron, the capacity retention ratio was further increased.

The following results is derived from the results in Tables 1 to 5. In the invention, the anode active material layer includes the anode active material and the inorganic compound (including one or both of the alkoxysilane compound and the hydrolysate). Therefore, the cycle characteristics and the initial charge-discharge characteristics are improved independent of the composition of the electrolytic solution, the battery configuration and the like.

Although the present invention is described referring to the embodiment and the examples, the invention is not limited thereto, and may be variously modified. For example, the case where the capacity of the anode is represented on the basis of insertion and extraction of lithium ions is described, but the invention is not limited thereto. The invention is also applicable to the case where the capacity of an anode includes a capacity on the basis of insertion and extraction of lithium ions and a capacity on the basis of deposition and dissolution of lithium metal, and is represented by the sum of them. In this case, as the anode active material, a material allowed to insert and extract lithium ions is used, and a chargeable capacity of the anode material is set to be smaller than the discharge capacity of a cathode.

Moreover, the case where the battery configuration is a prismatic type, a cylindrical type or a laminate film type, and the battery element has a spirally wound configuration is described, but the invention is not limited thereto. The invention is also applicable to the case where the battery configuration is a button type or the like, or the case where the battery element has a laminate configuration or the like.

The present application contains subject matter related to that disclosed in Japanese Priority Patent Application JP 2009-279802 filed in the Japan Patent Office on Dec. 9, 2009, the entire content of which is hereby incorporated by references.

It should be understood by those skilled in the art that various modifications, combinations, sub-combinations and alterations may occur depending on design requirements and other factors insofar as they are within the scope of the appended claims or the equivalents thereof.

What is claimed is:

1. A lithium-ion secondary battery comprising:
a cathode;
an anode including an anode active material layer; and
an electrolytic solution,
wherein,
the anode active material layer includes an anode active material and a compound,
the compound includes an (a) alkoxysilane compound represented by the formula $Si(R1)_n(OR2)_{4-n}$, where R1 represents a hydrocarbon group having from 1 to 8 carbons, both inclusive, R2 represents a hydrocarbon group having 1 to 4 carbons, both inclusive, n represents an integer of 0 to 3, both inclusive, and each of R1 and R2 may be substituted hydrocarbon groups or partially substituted hydrocarbon groups, and (b) a hydrolysate of the alkoxysilane compound.

2. The lithium-ion secondary battery according to claim 1, wherein the alkoxysilane compound includes one or more kinds selected from the group consisting of methyltrimethoxysilane, ethyltrimethoxysilane, methyltriethoxysilane, methyltriisopropoxysilane, methyltributoxysilane, propyltrimethoxysilane, dimethyldimethoxysilane, phenyltrimethoxysilane, diphenyldimethoxysilane and phenylmethyldimethoxysilane.

3. The lithium-ion secondary battery according to claim 1, wherein the hydrolysate is a polymer having a repeated structure of —Si—O— as a main chain.

4. The lithium-ion secondary battery according to claim 1, wherein the anode active material layer including the anode active material includes a plurality of gaps, and the anode active material layer includes the compound in the gaps.

5. The lithium-ion secondary battery according to claim 1, wherein the anode active material is in the form of a plurality of particles, and the anode active material layer includes the compound in spaces between the particles of the anode active material.

6. The lithium-ion secondary battery according to claim 1, wherein the anode active material includes silicon, tin, or both as constituent elements.

7. The lithium-ion secondary battery according to claim 1, wherein the anode active material is a simple substance, an alloy or a compound of silicon or tin.

8. An anode for lithium-ion secondary battery comprising:
an anode active material layer including an anode active material and a compound, wherein,
the compound includes, (a) an alkoxysilane compound represented by the formula $Si(R1)_n(OR2)_{4-n}$, where R1 represents a hydrocarbon group having from 1 to 8 carbons, both inclusive, R2 represents a hydrocarbon group having 1 to 4 carbons, both inclusive, n represents an integer of 0 to 3, both inclusive, and each of R1 and R2 may be substituted hydrocarbon groups or partially substituted hydrocarbon groups, and (b) a hydrolysate of the alkoxysilane compound.

9. A power tool powered by a lithium-ion secondary battery, the lithium-ion secondary battery including a cathode, an anode, and an electrolytic solution, the anode comprising an anode active material layer including an anode active material and a compound, the compound includes (a) an alkoxysilane compound represented by the formula $Si(R1)_n(OR2)_{4-n}$, where R1 represents a hydrocarbon group having from 1 to 8 carbons, both inclusive, R2 represents a hydrocarbon group having 1 to 4 carbons, both inclusive, n represents an integer of 0 to 3, both inclusive, and each of R1 and R2 may be substituted hydrocarbon groups or partially substituted hydrocarbon groups, and (b) a hydrolysate of the alkoxysilane compound.

10. An electric vehicle activated by a lithium-ion secondary battery as a power supply, the lithium-ion secondary battery including a cathode, an anode, and an electrolytic solution, the anode comprising an anode active material layer including an anode active material and a compound, the compound including (a) an alkoxysilane compound represented by the formula $Si(R1)_n(OR2)_{4-n}$, where R1 represents a hydrocarbon group having from 1 to 8 carbons, both inclusive, R2 represents a hydrocarbon group having 1 to 4 carbons, both inclusive, n represents an integer of 0 to 3, both inclusive, and each of R1 and R2 may be substituted hydrocarbon groups or partially substituted hydrocarbon groups, and (b) a hydrolysate of the alkoxysilane compound.

11. An energy storage system using a lithium-ion secondary battery as a power storage source, the lithium-ion secondary battery including a cathode, an anode, and an electrolytic solution, the anode comprising an anode active material layer including an anode active material and a compound, the compound including (a) an alkoxysilane compound represented by the formula $Si(R1)_n(OR2)_{4-n}$, where R1 represents a hydrocarbon group having from 1 to 8 carbons, both inclusive, R2 represents a hydrocarbon group having 1 to 4 carbons, both inclusive, n represents an integer of 0 to 3, both inclusive, and each of R1 and R2 may be substituted hydrocarbon groups or partially substituted hydrocarbon groups, and (b) a hydrolysate of the alkoxysilane compound.

* * * * *